US012492581B2

(12) United States Patent
Sanchez Rojas et al.

(10) Patent No.: US 12,492,581 B2
(45) Date of Patent: Dec. 9, 2025

(54) TWO-PULL, AUTOMATIC RESET, LATCH SYSTEM

(71) Applicant: INTEVA PRODUCTS, LLC, Troy, MI (US)

(72) Inventors: Hector Sanchez Rojas, Chihuahua (MX); Pedro Alvarado Heredia, Chihuahua (MX); Miguel Baray Gonzalez, Chihuahua (MX); Jesus Alvarez Morales, Chihuahua (MX); Alma Granados Arenas, Chihuahua (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 53 days.

(21) Appl. No.: 18/209,081

(22) Filed: Jun. 13, 2023

(65) Prior Publication Data

US 2023/0399877 A1 Dec. 14, 2023

Related U.S. Application Data

(60) Provisional application No. 63/393,811, filed on Jul. 29, 2022, provisional application No. 63/351,583, filed on Jun. 13, 2022.

(51) Int. Cl.

| | |
|---|---|
| ***E05B 81/90*** | (2014.01) |
| ***E05B 77/30*** | (2014.01) |
| ***E05B 81/06*** | (2014.01) |
| ***E05B 81/14*** | (2014.01) |
| ***E05B 81/34*** | (2014.01) |

(52) U.S. Cl.
CPC .............. *E05B 81/90* (2013.01); *E05B 77/30* (2013.01); *E05B 81/06* (2013.01); *E05B 81/14* (2013.01); *E05B 81/34* (2013.01)

(58) Field of Classification Search
CPC .......... E05B 81/90; E05B 81/06; E05B 77/22; E05B 77/30; E05B 81/86
See application file for complete search history.

(56) References Cited

U.S. PATENT DOCUMENTS

| | | | | |
|---|---|---|---|---|
| 2012/0061976 A1* | 3/2012 | Tostado | E05B 81/06 | 292/200 |
| 2014/0007404 A1* | 1/2014 | Krishnan | E05B 81/58 | 29/428 |

(Continued)

FOREIGN PATENT DOCUMENTS

| | | | | |
|---|---|---|---|---|
| DE | 102016109326 A1 * | 11/2017 | E05B 81/14 |
| FR | 3054257 A1 * | 1/2018 | E05B 81/16 |

*Primary Examiner* — Kristina R Fulton
*Assistant Examiner* — Emily G. Brown
(74) *Attorney, Agent, or Firm* — CANTOR COLBURN LLP

(57) ABSTRACT

A two-pull, automatic reset, latch system is configured to operate during a no-power scenario and a power scenario. The latch system includes a release system, a release lever, and a coupling lever. The release lever is pivotally engaged to a stationary structure about a first axis. The coupling lever pivots about a second axis offset from the first axis, and is adapted to couple the release lever to the release system during a no-power scenario and upon two actuations of the release lever. The coupling lever is further adapted to maintain decoupling of the release lever from the release system during a power scenario.

19 Claims, 36 Drawing Sheets

(56) References Cited

U.S. PATENT DOCUMENTS

| | | | | |
|---|---|---|---|---|
| 2016/0362916 | A1* | 12/2016 | Tomaszewski | E05B 81/06 |
| 2017/0009493 | A1* | 1/2017 | Didier | E05B 79/20 |
| 2017/0314297 | A1* | 11/2017 | Taurasi | E05B 77/30 |
| 2018/0038137 | A1* | 2/2018 | Damboiu | E05B 81/16 |
| 2018/0355642 | A1* | 12/2018 | Cumbo | E05B 83/36 |
| 2019/0271180 | A1* | 9/2019 | Sardelli | E05B 81/14 |
| 2020/0102771 | A1* | 4/2020 | Ney | E05B 77/30 |
| 2020/0149325 | A1* | 5/2020 | Tomaszewski | E05B 77/30 |

* cited by examiner

TWO-PULL, AUTOMATIC RESET, LATCH SYSTEM

CROSS REFERENCE TO RELATED APPLICATIONS

This application claims the benefit of U.S. Provisional Patent Application Ser. No. 63/351,583 filed on Jun. 13, 2022 and U.S. Provisional Patent Application Ser. No. 63/393,811 filed on Jul. 29, 2022, the entire contents each of which are incorporated herein by reference thereto.

BACKGROUND

The subject matter disclosed herein relates to door latches and, more particularly, to two-pull, automatic reset, latch systems.

In some vehicles, door(s) may include a power release latch that features an inside release handle, but may not have a mechanical outside release lever, may not have a key cylinder release lever, or may include a child lock. Various government regulations, or other requirements, may impress that such systems should have a two-pull release system. In a no-power scenario, the first pull of the release cable may not release the latch but may couple the release cable to the latch release system. Upon a second pull of the release cable, the latch will release.

In a power scenario, the first pull may not release the latch, and before the second pull occurs, the system must reset and fully decouple the cable and release system again. This makes the functioning of second pull the same as the first pull (i.e., the latch is not released). Since the two-pull release system is mechanical, a motor is used to electrically reset the system before the second pull can occur. Unfortunately, timing is often of concern. That is, when the system decouples and becomes coupled again during the first pull. Also, partial pulls may partially unlock the door enough to release the system but does not reset the system. Yet further, two pulls occurring in quick succession may release the door before the system can tell the controller to power the motor to reset. Accordingly, it is desirable to provide an improved latching system and method of operation.

BRIEF DESCRIPTION

A two-pull, automatic reset, latch system according to one, non-limiting, exemplary embodiment includes a release lever, a coupling lever, a reset lever, and override link, and a biasing member. The release lever is adapted to pivot about a first axis and in a first rotational direction upon manual actuation, and includes a stop face facing circumferentially in the first rotational. The coupling lever is adapted to pivot about a second axis offset from the first axis and between coupled and decoupled conditions, and is in contact with the stop face when in the coupled condition and circumferentially spaced from the stop face when in the decoupled condition. The reset lever is adapted to rotate about a third axis, and includes a first block-out surface facing in a second rotational direction opposite to the first rotational direction and with respect to the third axis. The override link is pivotally engaged to the coupling lever, and is adapted to pivot about a fourth axis. The override link includes a second block-out surface facing radially outward with respect to the fourth axis. The biasing member is adapted to exert a biasing force upon the coupling lever in the first rotational direction with respect to the second axis. Upon an initial manual actuation of the release lever, the override link is adapted to make circumferential contact with the reset lever with respect to the third axis for back-drive of the reset lever in the first rotational direction and the coupling lever, the coupling lever is in the decoupled condition, and the coupling lever is in contact with the first block-out surface. Upon continued manual actuation of the release lever, the coupling lever is spaced from the first block-out surface and is in contact with the second block-out surface, and the coupling lever is in the decoupled condition.

In addition to the forgoing embodiment, the two-pull, automatic reset, latch system includes an auto reset switch configured to be actuate following disengagement of the first block-out surface from the coupling lever and with the second block-out surface in contact with the coupling lever.

In another, non-limiting, embodiment, a two-pull, automatic reset, latch system comprises a release system adapted to effectuate unlatching during a power scenario; a release lever pivotally engaged to a stationary structure and about a first axis, wherein manual actuation of the release lever during the power scenario does not couple the release lever to the release system, and a second, successive, manual actuation of the release lever during a no-power scenario causes coupling of the release lever to the release system to effectuate manual unlatching; a coupling lever pivotally engaged to the release lever and about a second axis, wherein the coupling lever is in contact with the release system when coupled; an override link pivotally engaged to the release lever about a third axis; and a reset lever rotationally engaged to the stationary structure about a fourth axis and adapted to reset the system to a home position after manual actuation of the release lever and during the power scenario while the release lever remains decoupled from the release system.

In addition to the foregoing embodiment, the coupling lever is in contact with the reset lever during an initial first manual actuation of the release lever thereby blocking the coupling lever from coupling the release lever with the release system.

In the alternative or additionally thereto, in the foregoing embodiment, the continued manual actuation of the release lever effectuates a blocking transition wherein the contact of the coupling lever with the reset lever is released and the coupling lever transitions to a sliding contact with the override link.

In the alternative or additionally thereto, in the foregoing embodiment, the override link is in contact with the reset lever thereby driving the reset lever during the manual actuation of the release lever.

In addition to the foregoing embodiment, the two-pull, automatic reset, latch system comprises a gear home switch configured to be actuated during a first manual actuation of the release lever; and an electronic controller configured to receive a gear actuation signal from the gear home switch during a power scenario, initiate a timer upon receipt of the actuation signal, and energize an electric motor of the release system to reset the system to a home position upon expiration of the timer.

In the alternative or additionally thereto, in the foregoing embodiment, the two-pull, automatic reset, latch system comprises an auto reset switch configured to be actuated upon completion of the first manual actuation of the release lever and during the power scenario, wherein the electronic controller is configured to receive a reset actuation signal from the auto reset switch during the power scenario, and energize the electric motor to reset the system to the home position.

In the alternative or additionally thereto, in the foregoing embodiment, the two-pull, automatic reset, latch system comprises a switch link adapted to actuate the auto reset switch, wherein the switch link is pivotally connected to the release lever and about the third axis.

In the alternative or additionally thereto, in the foregoing embodiment, the two-pull, automatic reset latch system comprises a reset lever engaged to a gear driven by the motor, wherein the reset lever and the gear are adapted to rotate about the fourth axis, and the gear home switch is actuated via contact with the reset lever.

In the alternative or additionally thereto, in the foregoing embodiment, the two-pull, automatic reset latch system comprises an override link pivotally engaged to the release lever about the third axis, wherein the override link is adapted to engage the reset lever to drive the reset lever about the fourth axis upon manual actuation of the release lever. Driving of the reset lever causes a blocking transition of the coupling lever to maintain decoupling of the release lever from the release system.

In another, non-limiting, embodiment, a method of operating a two-pull automatic reset, latch system comprises first pivoting a release lever from a home position, about a first axis, and during a no-power scenario, wherein the release lever is pivotally engaged to a stationary structure about the first axis;

blocking a coupling lever from coupling the release lever to a release system via contact of the coupling lever with a reset lever adapted to engage the release system, wherein the coupling lever is pivotally engaged to the stationary structure about a second axis, and the reset lever is pivotally engaged to the stationary structure about a third axis; contacting an override link to the reset lever during the first pivoting, wherein the override link is pivotally engaged to the release lever about a fourth axis; back-driving the reset lever via contact of the override link to the reset lever, and with continued first pivoting; transitioning the blocking of the coupling lever by releasing contact of the coupling lever from the reset lever while slideably contacting the coupling lever to the override link with continued first pivoting; releasing the reset lever from the override link with continued first pivoting; unblocking the coupling lever; fixing the override link to the coupling lever with continued first pivoting; engaging the release lever to the release system via the coupling of the coupling lever between the release lever and the release system; and performing a second pivoting of the release lever to manually actuate the release system during the no-power scenario.

In addition to the foregoing embodiment, the first, second, third, and fourth axes are spaced from and parallel to one-another.

In the alternative or additionally thereto, in the foregoing embodiment, the second pivoting of the release lever will not manually actuate the release system during a power scenario.

In the alternative or additionally thereto, in the foregoing embodiment, the method comprises first pivoting the release lever about the first axis and during a power scenario; blocking the coupling lever from coupling the release lever to the release system via contact of the coupling lever with the reset lever adapted to engage the release system; contacting the override link to the reset lever during the first pivoting; back-driving the reset lever via contact of the override link to the reset lever, and with continued first pivoting; transitioning the blocking of the coupling lever by releasing contact of the coupling lever from the reset lever while slideably contacting the coupling lever to the override link with continued first pivoting; actuating a gear home switch via contact of the gear home switch with the reset lever as the reset lever is back-driven; initiating a timer upon actuation of the gear home switch during a power scenario; and resetting the system to the home position upon expiration of a prescribed time and during the power scenario.

In the alternative or additionally thereto, in the foregoing embodiment, the gear home switch is configured to effect control of a motor of the release system and turn off the motor during an auto reset event to avoid motor stall.

In the alternative or additionally thereto, in the foregoing embodiment, the method includes releasing the reset lever from the override link with continued first pivoting during the power scenario; and actuating an auto reset switch via contact of the auto reset switch with a switch link, wherein the switch link is pivotally connected to the release lever about the fourth axis.

In the alternative or additionally thereto, in the foregoing embodiment, the auto reset switch is configured to effect control of a motor of the release system when actuated.

In the alternative or additionally thereto, in the foregoing embodiment, the method comprises driving the reset lever via the motor to return the system to the home position and during the power scenario.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
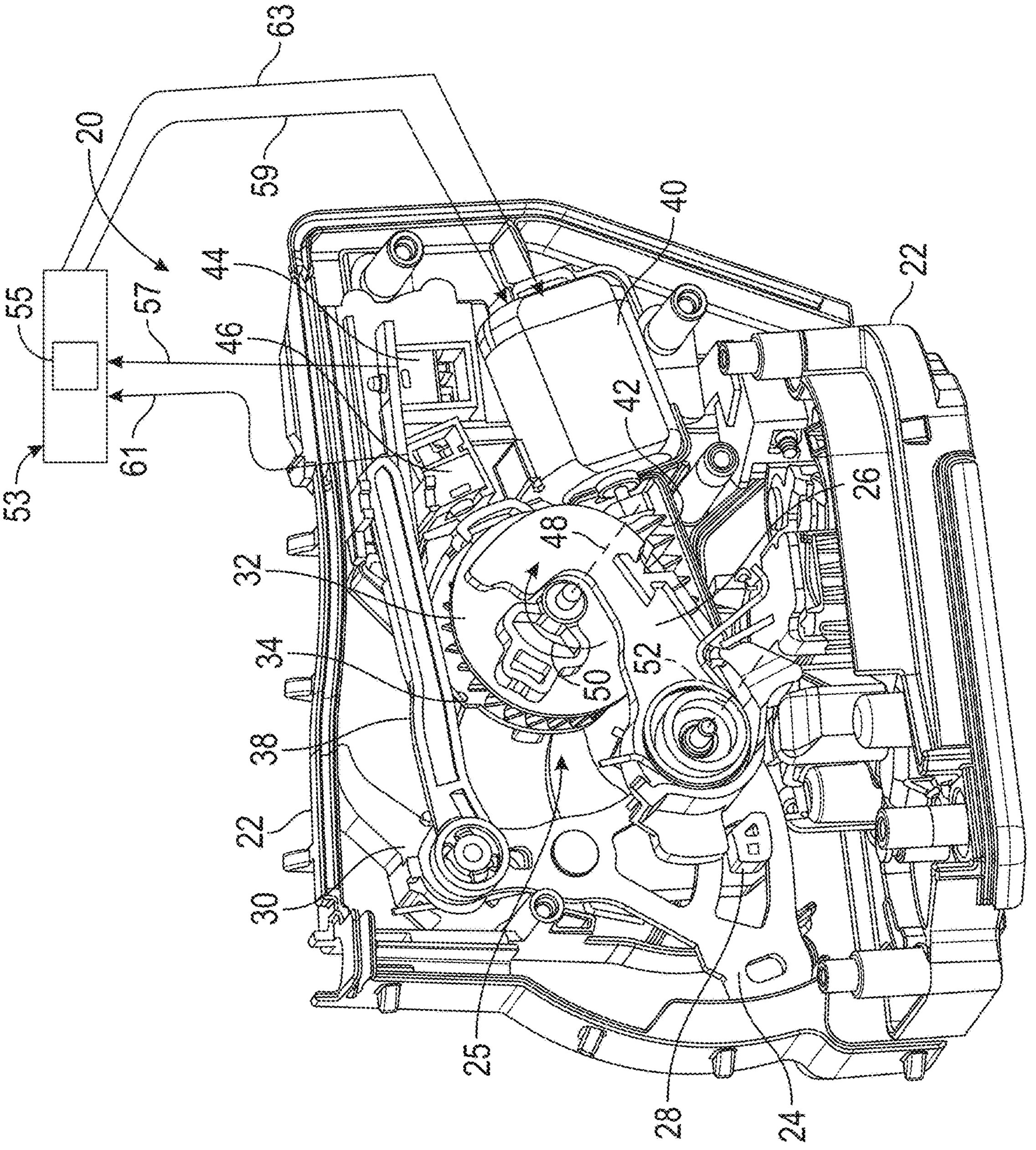
FIG. 1 is a perspective view of two-pull, automatic reset, latch system as one, non-limiting, exemplary embodiment of the present disclosure.

Referring now to FIG. 1, a two-pull, automatic reset, latch system 20 is illustrated with a portion of a housing removed to show internal detail. The latch system 20 includes a stationary structure 22 (e.g., the housing), a release lever or inside release lever 24 (i.e., cable or manual release lever), a release system 25 (e.g., power release system), a coupling lever 28, an override link 30, a reset lever 34 (also see FIGS. 5 and 6), a switch link 38, an auto reset switch 44, and a gear home switch 46. The release system 25 may include a power release lever 26, a gear 32, an electric motor 40, and a worm gear 42. The electric motor 40 of the release system 25 is adapted to drive (i.e., rotate) the worm gear 42, which in-turn drives the gear 32 about a rotation axis 48 and in a rotational driven direction (see arrow 50) with respect to rotation axis 48. Rotation of the gear 32 drives the power release lever 26, which pivots about a pivot axis 52 and in the same driven direction 50 (e.g., clockwise as illustrated) but with respect to pivot axis 52. As the power release lever 26 pivots in the direction 50, the latch system 20 generally moves toward an unlatched state. In one embodiment, the rotation axis 48 and the pivot axis 52 are substantially parallel to, and spaced apart from one-another.

The latch system 20 may further include an electronic controller 53 that may include a processor (e.g., microprocessor) and an electronic storage medium that may be non-transitory. The processor includes a timer 55 and the electronic storage medium includes a preprogrammed time period applied by the timer 55 of the processor. The auto reset switch 44 is configured to send a reset actuation signal 57 to the controller 53 that processes the signal 57 and outputs a command, or energize, signal 59 to the electric motor 40. The gear home switch 46 is configured to send a reset actuation signal 61 to the controller 53. The controller 53 may then initiate the timer 55 and send a command, or energize, signal 63 to the motor 40 upon expiration of the preprogrammed time period. It is contemplated and understood that the system 20 may include multiple controllers and/or each switch 44, 46 may include an integrated controller.

Figure 2:
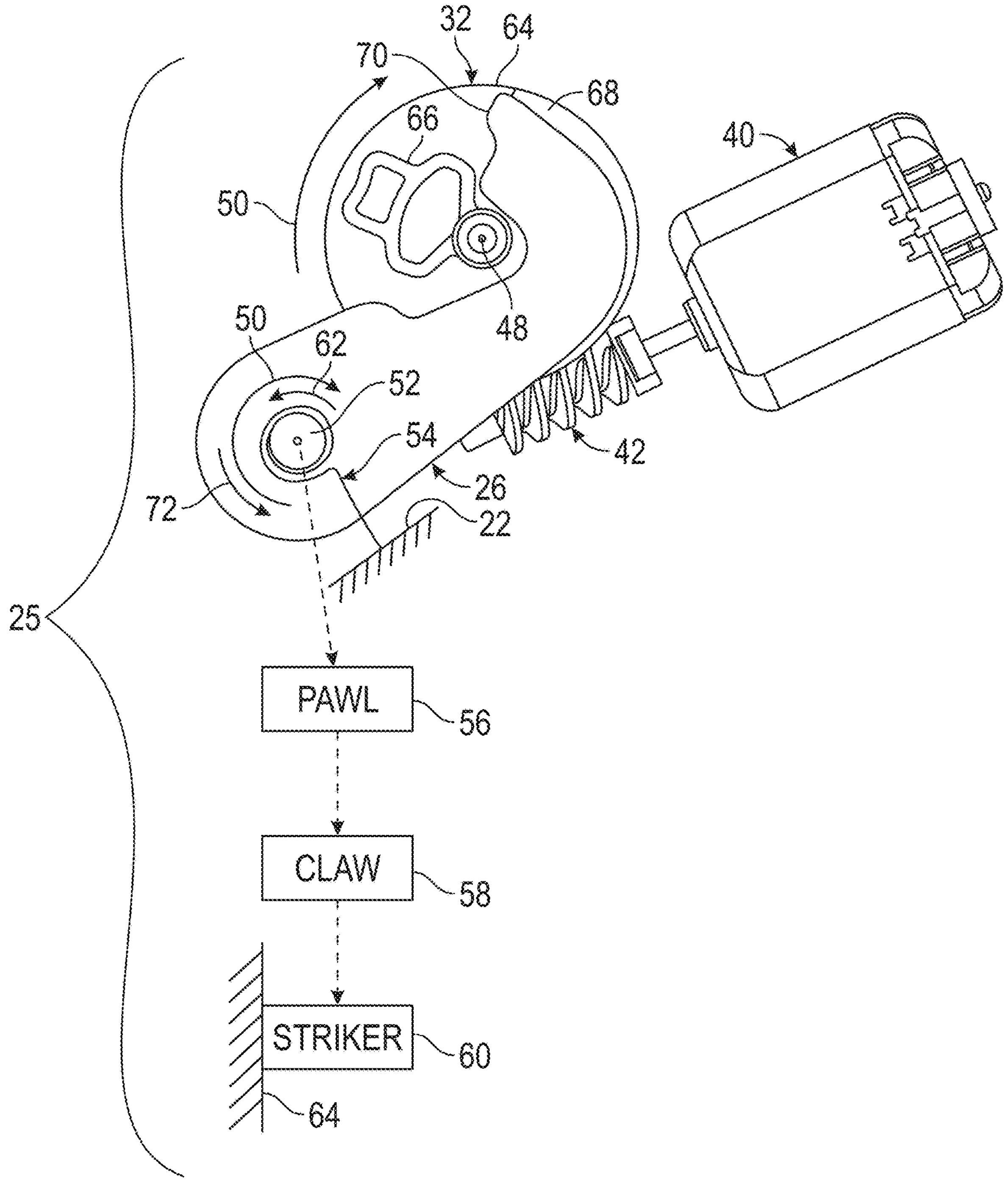
FIG. 2 is a partial plan view and partial schematic of a power release system of the two-pull, automatic reset, latch system.
Figure 3:
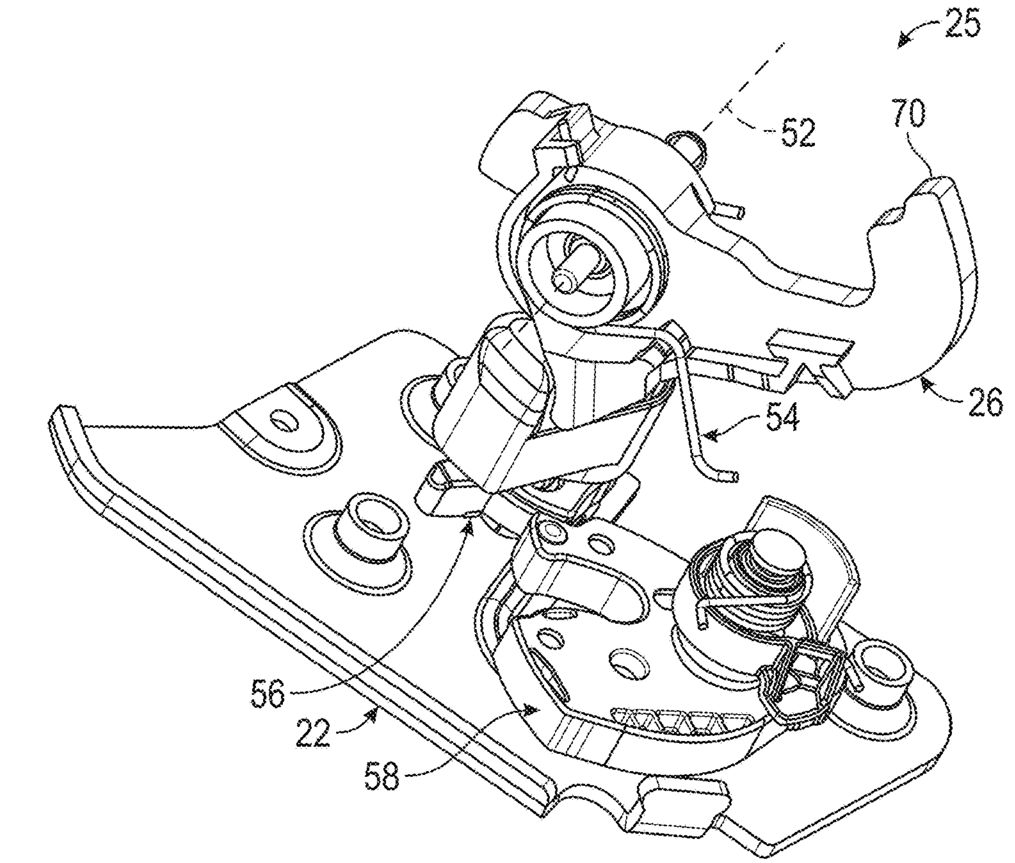
FIG. 3 is a perspective view of the power release system.

Referring to FIGS. 2 and 3, the release system 25 of the latch system 20 may further include a biasing member 54 (e.g., coiled torque spring), a pawl 56, a claw 58, and a striker 60. The pivoting motion of the power release lever 26 in the driven direction 50 is against a biasing force (see arrow 62) exerted by the biasing member 54, and facilitates actuation (e.g., rotation) of the pawl 56 that actuates the claw 58 for release from the striker 60. The pawl 56 and claw 58 may be rotationally mounted to the housing 22, and the striker 60 is typically mounted to a stationary structure 64 (e.g., door frame).

The gear 32 of the release system 25 includes a disk component 64 that carries a plurality of gear teeth, which mate with the worm gear 42, and a cam component 66. The cam component 66 may be rigidly attached to the disk component 64. In one embodiment, the gear 22 may be one unitary piece, and may be made of an injection molded plastic.

In one embodiment, the power release lever 26 of the release system 25 projects radially outward from the pivot axis 52 and to a segment 68 (e.g., distal end segment) that may be orientated beyond the rotation axis 48. The distal end segment 68 includes a cam portion 70 adapted to operatively contact, or mate with, the cam component 66 of the gear 32. The cam component 66 of the gear 32 and the cam portion 70 may be generally circumferentially opposed to one-another. The cam component 66 generally faces in the driven direction 50 and the cam portion 70 generally faces in a circumferential direction (see arrow 72) that is opposite the driven direction 50.

In one embodiment, the cam component 66 of the gear 32 and the cam portion 70 of the power release lever 26 are shaped to promote a low-speed, high-torque, operation of the power release lever 26 to initially release the claw 58 from the striker 60. After release, and with continued pivoting of the power release lever 26 in the driven direction 50, the motion of the power release lever 26 may transform to a high-speed and low-torque condition. In one example, and to facilitate the desired change in operation condition, the cam component 66 and the cam portion 70 may each be serpentine in shape, or other complex shape that promotes the desired changes in speed and torque.

The latch system 20 is adapted to require two manual pulls from a user to effectuate actuation of the release system 25, and release the claw 58 from the striker 60 during a no-power scenario (i.e., no electric power). More specifically, the release lever 24 remains "decoupled" from the release system 25 during a no-power scenario before the first pull of the release lever 24 and after the first pull. It is not until the release lever 24 is pulled a second time that the release lever 24 engages (i.e., couples) the release system 25 for manual release of the claw 58 from the striker 60. During a power scenario (the system is configured to actuate via the electric motor 40), the latch system 20 is adapted to keep the release lever 24 "decoupled" from the release system 25 regardless of the number of manual pulls by the user.

Therefore, one function of the latch system 20 is to reset the system (i.e., achieve decoupling) during a first pull event, but before a second pull event can occur during a power scenario. Another function of the system 20 is to not allow a partially coupled condition to occur. That is, if the system 20 enabled a partial pull to couple the system, then if two pulls are done quickly in succession, the system may have minimal time to reset itself, and the claw 58 could be released from the striker 60.

Figure 4:
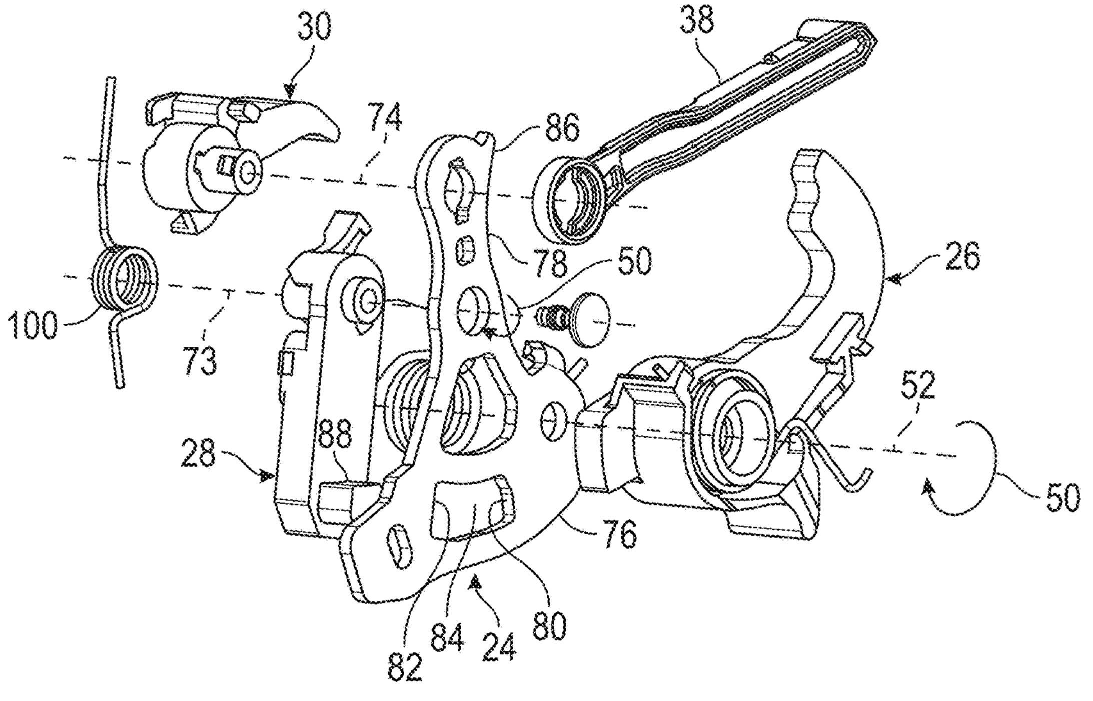
FIG. 4 is a partial, unassembled, perspective view of the two-pull, automatic reset, latch system.

Referring to FIGS. 1 and 4, the release lever 24 is pivotally engaged to the housing 22, is constructed to pivot about an axis 52, and attaches directly to a release cable (not shown). The release cable may generally be the mechanical element gripped and pulled by the user. When pulled, the release lever 24 pivots about axis 52 and in the rotation direction 50 (see FIG. 4).

The power release lever 26 is pivotally engaged to the release lever 24, pivots about the axis 52, and is adapted to release the claw 58 from the striker 60 as previously described. The coupling lever 28 is pivotally engaged to the housing 22, is constructed to pivot about the axis 73, and facilitates the coupling and decoupling of the release lever 24 from the power release lever 26. The override link 30 and switch link 38 are pivotally engaged to the release lever 24, and pivot about an axis 74. The axes 52, 73, 74 are substantially parallel to, and spaced apart from, one-another.

As best shown in FIG. 4, the release lever 24 includes first and second arms 76, 78 each projecting radially outward from the axis 52. The first arm 76 carries circumferentially opposing faces 80, 82 that may at least in-part define an opening 84. The second arm 78 may be about diametrically opposite the first arm 76 and radially projects to a distal end 86. The coupling lever 28 includes a member 88 spaced radially outward from axis 73, and projecting axially through the opening 84 of the first arm 76. The override link 30 is pivotally connected to the distal end 86 of the second arm 78 and about axis 74.

In operation, face 80 serves as a home position hard stop for the coupling lever 28. When in a coupled condition, the coupling lever 28 rests on the face 80. Face 82 may never make contact with the coupling lever 28, but merely provides clearance in the slot, or opening, 84 so the coupling lever 28 can achieve full travel.

Figure 5:
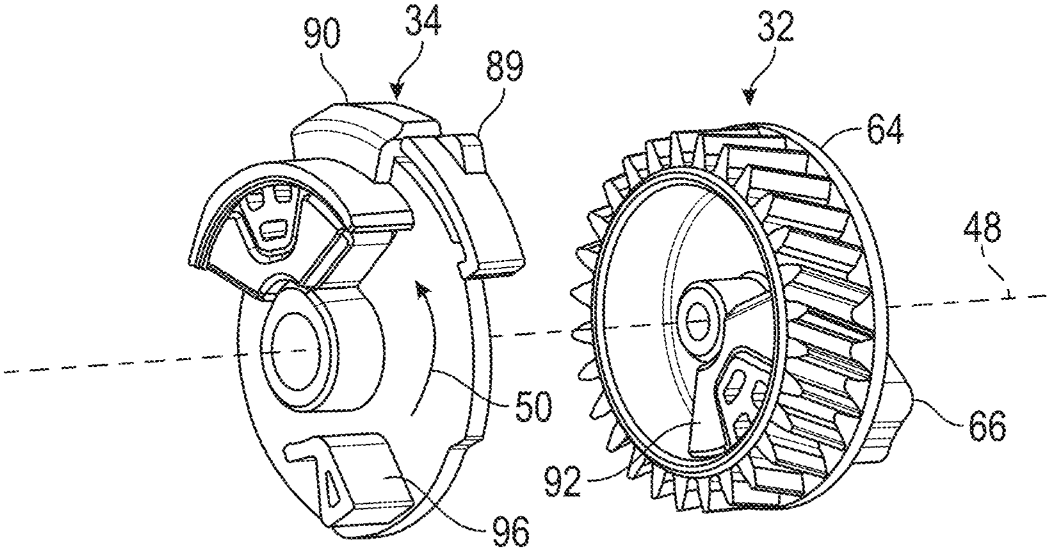
FIG. 5 is an unassembled, perspective, view of a gear and a reset lever of the two-pull, automatic reset, latch system.
Figure 6:
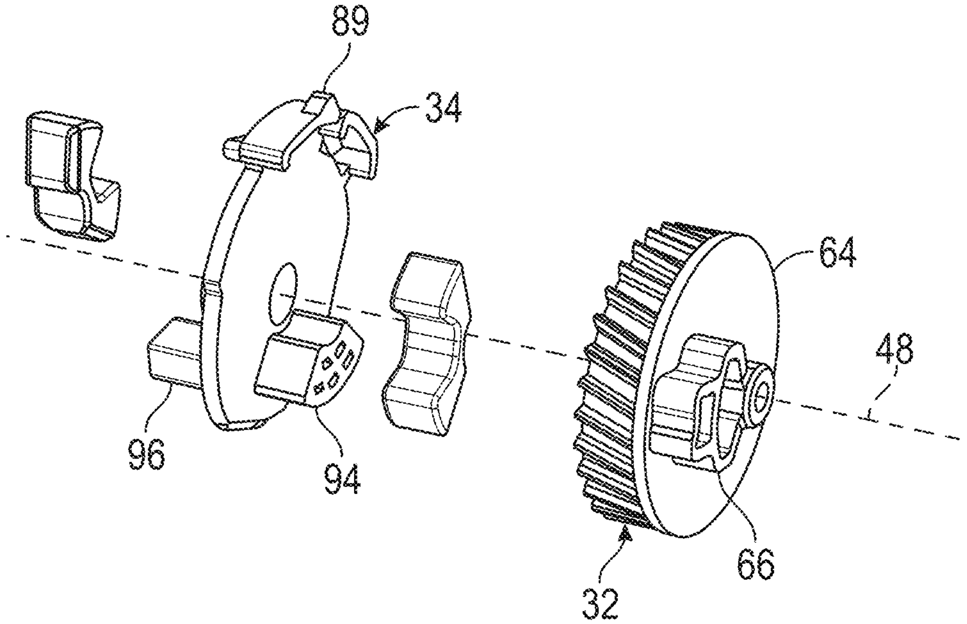
FIG. 6 is another unassembled, perspective, view of the gear and the reset lever of the two-pull, automatic reset, latch system.

Referring to FIGS. 1, 5, and 6, the reset lever 34 may be disk-like, and is adapted to rotate about the axis 48. When the system 20 is decoupled, the reset lever 34 is generally held in a decoupled position by any number of factors. For example, the torque required to back-drive the gear 32 is sufficient to prevent movement of the reset lever 34 without an additional external force that is capable of providing enough torque on the reset lever 34 to back-drive the electric motor 40. Additionally, the reset lever 34 may include a leaf tab 89 (see FIGS. 5 and 6) that generally projects radially outward with respect to axis 48. The leaf tab 89 is adapted to bias the reset lever 34 in the home, or maximum travel, position (i.e., decoupled position). It is further contemplated that other methods can be applied to bias the reset lever 34 including the use of an over-center spring.

Figure 7:
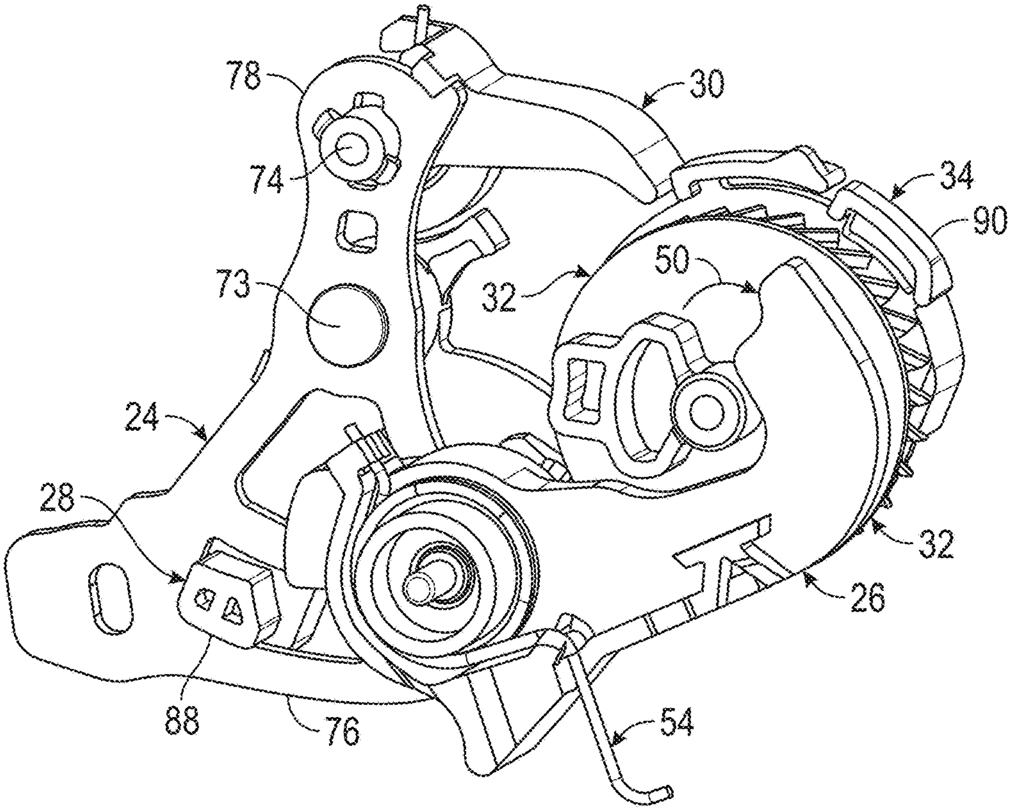
FIG. 7 is a partial perspective view of the two-pull, automatic reset, latch system illustrated in a decoupled state.
Figure 8:
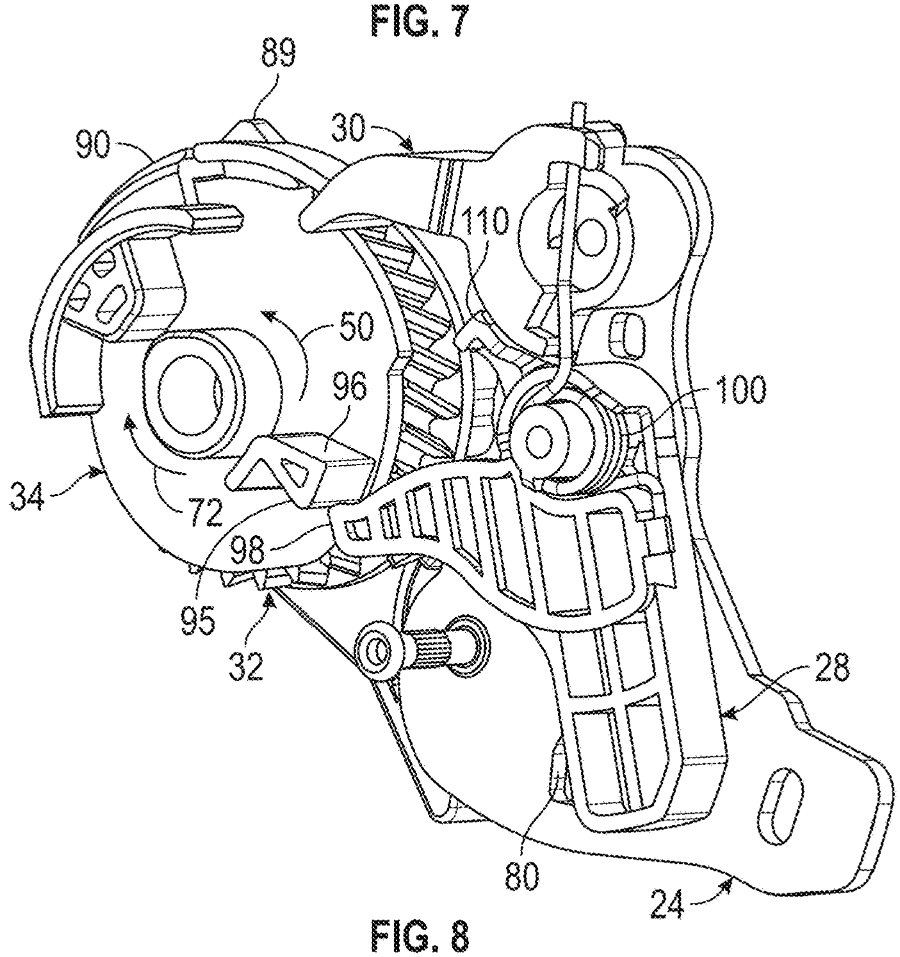
FIG. 8 is another partial perspective view of the two-pull, automatic reset, latch system illustrated in the decoupled state.

Referring to FIGS. 7, and 8, the latch system 20 is illustrated in a decoupled state. When decoupled from the release system 25, the reset lever 34 holds the coupling lever 28 open, therefore decoupling the coupling lever 28 from the power release lever 26. When the coupling lever 28 is open, the member 88 of the coupling lever 28 may be proximate to (but not in contact with) the face 82 of the release lever 24 and spaced from the face 80. The rotational position of the coupling lever 28 may be solely controlled by the reset lever 34 and/or override link 30. When the system 20 is coupled, the coupling lever 28 is in contact with the face 80 as a hard stop, and the rotational position of the coupling lever 28 is no longer controlled by the reset lever 34 or the override link 30.

When in the decoupled state, if the release lever 24 is rotated, the coupling lever 28 will move with the release lever 24, but the release lever will not move the power release lever 26 on the first pull. The coupling lever 28 pivots on the release lever 24. Therefore, any time the release lever is actuated, the coupling lever 28 will translate, or rotate, with the release lever 24. Actuating the release lever 24 does not directly affect the rotational position of the coupling lever 28. So for instance, when the system 20 is coupled, the coupling lever 28 will not rotate about axis 73. When decoupled, the rotational position of the coupling lever 28 with respect to axis 73 is controlled by the reset lever 34, or the override link 30. When the coupling lever 28 becomes coupled, face 80 controls the rotational position.

When in the decoupled state, the latch system 20 is in the home position. The home position is that position with, or without, power, and is that position at the start of the first manual pull.

Figure 9:
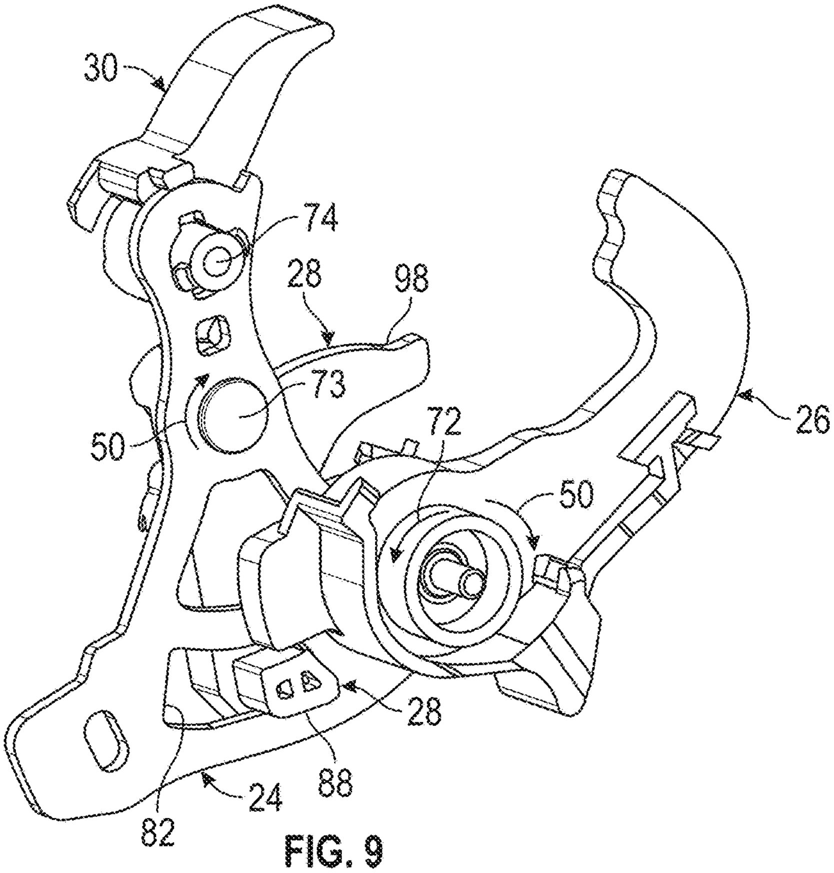
FIG. 9 is a partial plan view of the two-pull, automatic reset, latch system illustrated in a coupled state.
Figure 10:
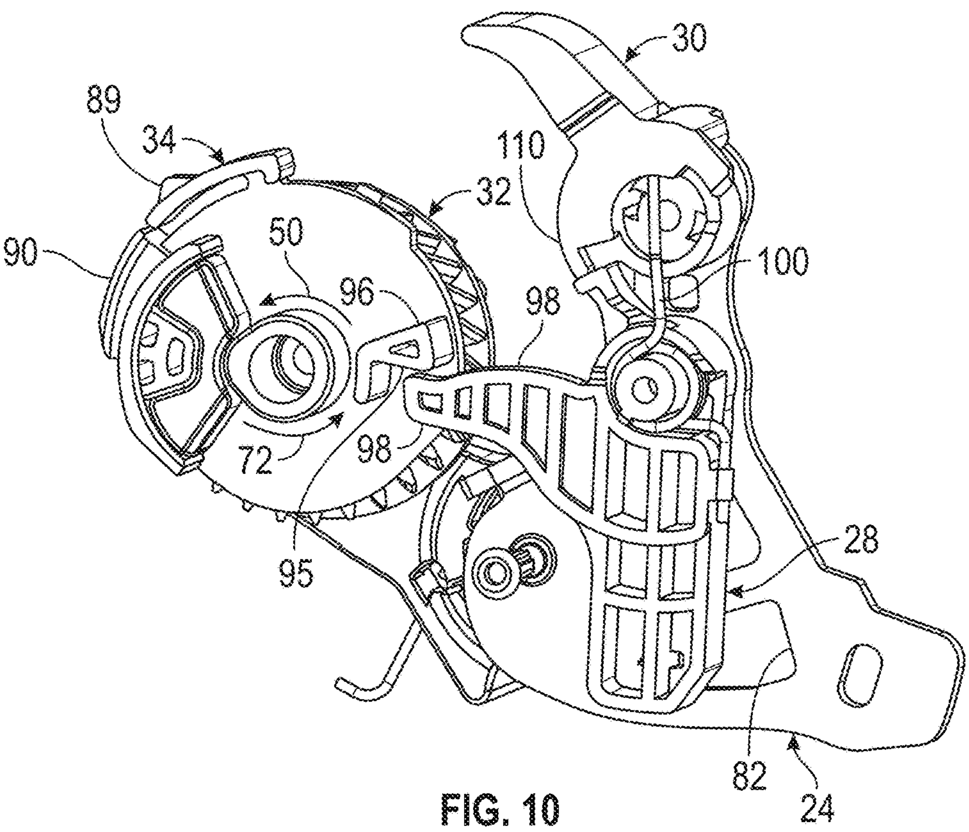
FIG. 10 is another partial plan view of the two-pull, automatic reset, latch system illustrated in the coupled state.
Figure 15:
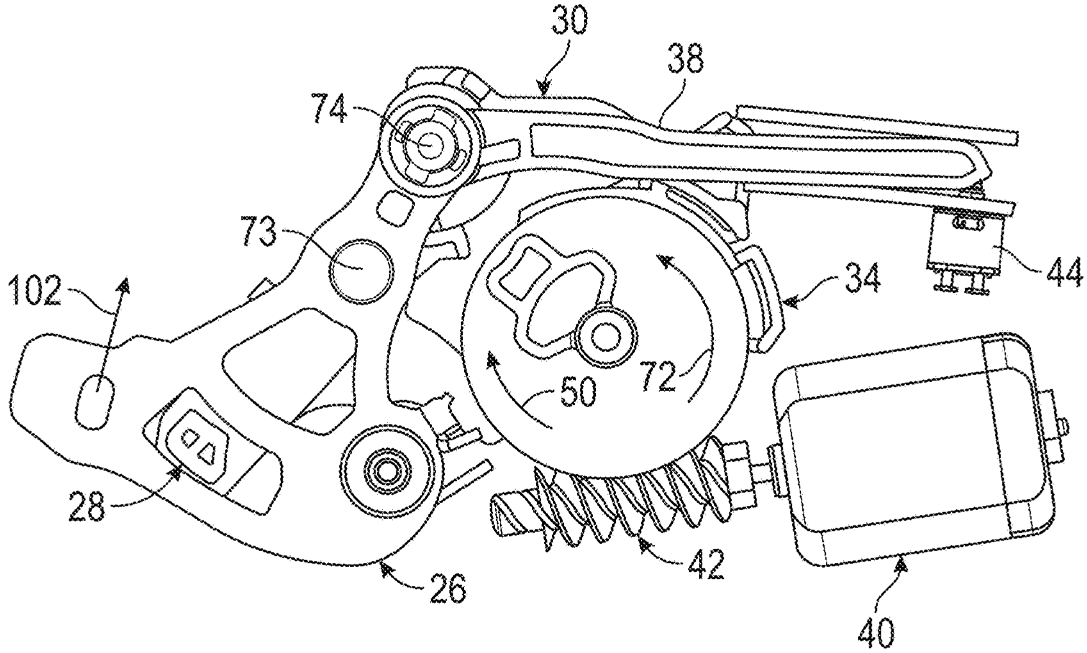
FIG. 15 is a partial plan view of the two-pull, automatic reset, latch system illustrated in the decoupled state and with the release lever of the two-pull, automatic reset, latch system manually rotated via the first pull by about twenty-two degrees thereby facilitating actuation of an auto rest switch of the two-pull, automatic reset, latch system via a switch link of the two-pull, automatic reset, latch system.
Figure 16:
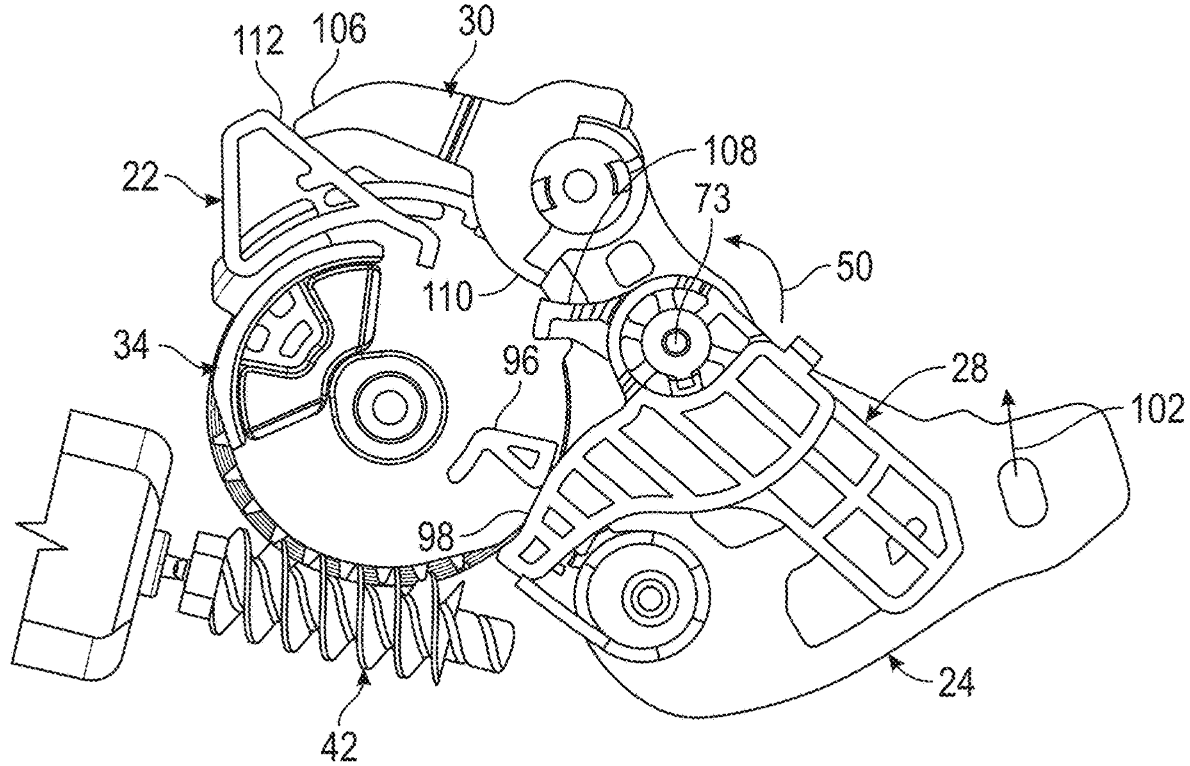
FIG. 16 is a partial plan view of the two-pull, automatic reset, latch system illustrated in the decoupled state and with the release lever of the two-pull, automatic reset, latch system manually rotated via the first pull by about twenty-eight degrees, and generally illustrating an initial unblocking of the coupling lever.

Referring to FIGS. 1, 9, and 10, the latch system 20 is illustrated in a coupled state. When coupled, the coupling lever 28 is engaged, or coupled, with the power release lever 26 of the release system 25. If the release lever 24 is rotated in the rotation direction 50 (see FIG. 9), the power release lever 26 will move with the coupling lever 28 because the member 88 of the coupling lever 28 is in contact with the face 80 of the release lever 24 (also see FIG. 4). As one example, FIGS. 15 and 16 illustrate the results of a successful first manual pull after a successful auto reset operation and with power on. FIGS. 9 and 10 illustrate the results of a successful first manual pull with the power off (or auto reset mode off).

In operation, the coupling lever 28, which either engages (i.e., couples) (see FIGS. 9 and 10) or decouples (see FIGS. 7 and 8) the release lever 24 to the power release lever 26 of the release system 25, may be 'blocked-out' in two ways.

For the first way, the reset lever 34 (also see FIGS. 5 and 6) that is coupled to the gear 32 is constructed to block-out the coupling lever 28. For the second way, the override link 30 facilitates blocking-out the coupling lever 28.

Figure 11:
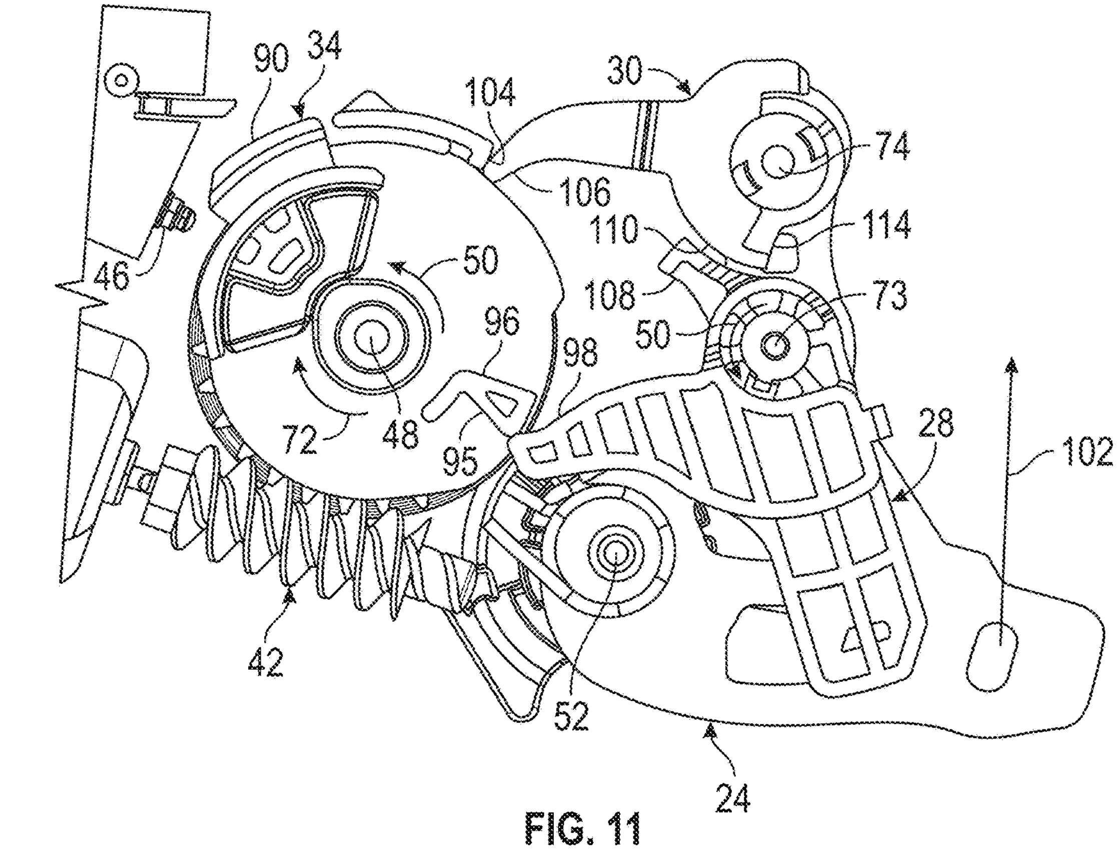
FIG. 11 is a partial plan view of the two-pull, automatic reset, latch system illustrated in the decoupled state and with a release lever of the two-pull, automatic reset, latch system manually rotated via a first pull by about three degrees thereby contacting a reset lever with an override link of the two-pull, automatic reset, latch system.

Referring to FIGS. 8 and 11, blocking-out is achieved via the second tab 96 of the reset lever 34 that drives and holds the coupling lever 28 open. If the reset lever 34 and gear 32 are in a back-driven condition, the circumferentially facing block-out surface 95 carried by the second tab 96 is no longer in contact with the coupling lever 28, and the return spring 100 on the coupling lever 28 will begin moving the coupling lever to a coupled condition. For example, during a first pull of the system 20, the override link 30 begins to back-drive the reset lever 34. As this occurs, the reset lever 34 begins to allow the coupling lever 28 to move towards a coupled condition. But, as the coupling lever 28 is moving towards the coupled condition, the coupling lever 28 then comes in contact with the surface 110 carried by the override link 30 (see FIG. 12A). As this occurs, the reset lever 34 continues to back-drive. With continued back-drive, the reset lever 34 no longer controls the position of the coupling lever 28, and instead, the override link 30 controls the position of the coupling lever 28.

With continued operation, and as the release lever 24 is continued to be pulled, the reset lever 34 becomes fully back-driven, and a ramp feature 112 of the housing 22 forces rotation on the override link 30. This rotation first disengages the override link 30 from back-driving the reset lever 34, and then as travel continues, the reset lever 34 becomes disengaged from the coupling lever 28 (see FIGS. 16 and 17). At this point, two scenarios for auto reset may occur. In a power on (i.e., auto reset mode) scenario, the gear 32 drives the reset lever 34 back to a coupled position (see FIG. 16) immediately following the override link 30 becoming disengaged with the reset lever 34, with the intention of blocking-out the coupling lever 28 again before it has a chance to disengage the second block-out surface 110 (i.e., never becomes fully unblocked). In a power off mode, the reset lever 34 does not move, and when the second block-out surface 110 becomes disengaged, the coupling lever 28 fully moves to a coupled position and hard stops on face 80.

The override link 30 may also be applied to unblock the reset lever 34, and back-drive the gear 32. During the travel of the release lever 24 in a decoupled scenario, the override link 30 may first begin to unblock the reset lever 34, which also back-drives the gear 32. Once the reset lever 34 is no longer blocking-out the coupling lever 28, the override link 30 disengages the reset lever 34.

At this time, the auto reset switch 44 (see FIG. 1) is activated. If there is power to the release system 25, the gear 32 (i.e., driven by the motor 40) will drive the reset lever 34 back to a blocked-out position (also see FIGS. 16 and 17), and can now be back-driven again once the release lever 24 is returned home for another pull. If there is no power, the override link 30 will continue to travel, and due to housing features of the system 20, will rotate and unblock, or disengage, from the coupling lever 28, thereby facilitating a full unblocking of the system 20. At this time, the coupling lever 28 is free to reengage with the release system 25. When the release lever 24 returns home, the coupling lever 28 will couple the release lever 24 to the power release lever 26, and on the second pull, can release the claw 58, from the striker 60.

Referring to FIG. 6, a tab 94 of the reset lever 34 mates the inside of the gear 32. The position of the tab 94 facilitate back-driving of the gear 32, worm 42 and motor 40 when the rest lever 34 is rotated. In reverse, if the gear 32 rotates in the opposite direction, then the tab 94 facilitates driving of the reset lever 34 back to the initial position of the reset lever. In another embodiment, the gear 32 and the reset lever 34 may be one single component (i.e., one piece).

In order for the auto reset (i.e., resetting between the first and second pulls) to function, the system 20 includes the auto reset switch 44 and the gear home switch 46 (see FIG. 1). The gear home switch 46 is activated by a radial extrusion 90 of the reset lever 34 (also see FIG. 7), or the gear 32. The auto reset switch 44 is activated at a specified point in the travel of the release lever 24, and may be directly activated by the switch link 38 (see FIG. 1).

In operation, the switch link 38 actuates the auto reset switch 44 when the system 20 is coupled (see FIGS. 1, 9 and 10). Actuation of the switch 44 energizes the motor 40 causing the motor 40 to drive the gear 32 in rotation direction 72. A stop 92 of the gear 32 rotationally engages the tab 94 of the reset lever 34 (see FIG. 4), thereby rotating the reset lever 34 with the gear 32 when driven from the coupled state (see FIG. 10) to the decoupled state (see FIG. 8). Also, when rotating in direction 72, a second tab 96 of the reset lever 34 contacts a distal end of an extension 98 of the coupling lever 28 causing the coupling lever 28 to pivot in the direction 72 and about axis 73. Once the coupling lever 28 is in the decoupled condition, the override link 30 is free to rotate to its decoupled state using a biasing force of a biasing member 100 (e.g., coiled spring).

Referring to FIG. 11, the system 20 is illustrated in the decoupled state. In operation, when the user pulls the cable (not shown, see arrow 102 for direction), the release lever 24 begins to pivot in direction 50 about axis 52. During this initial travel, initial contact is made between a contact surface 104 carried by the reset lever 34 and a distal end 106 of the override link 30. The contact surface 104 faces in the circumferential, or rotation, direction 72.

Figure 12A:
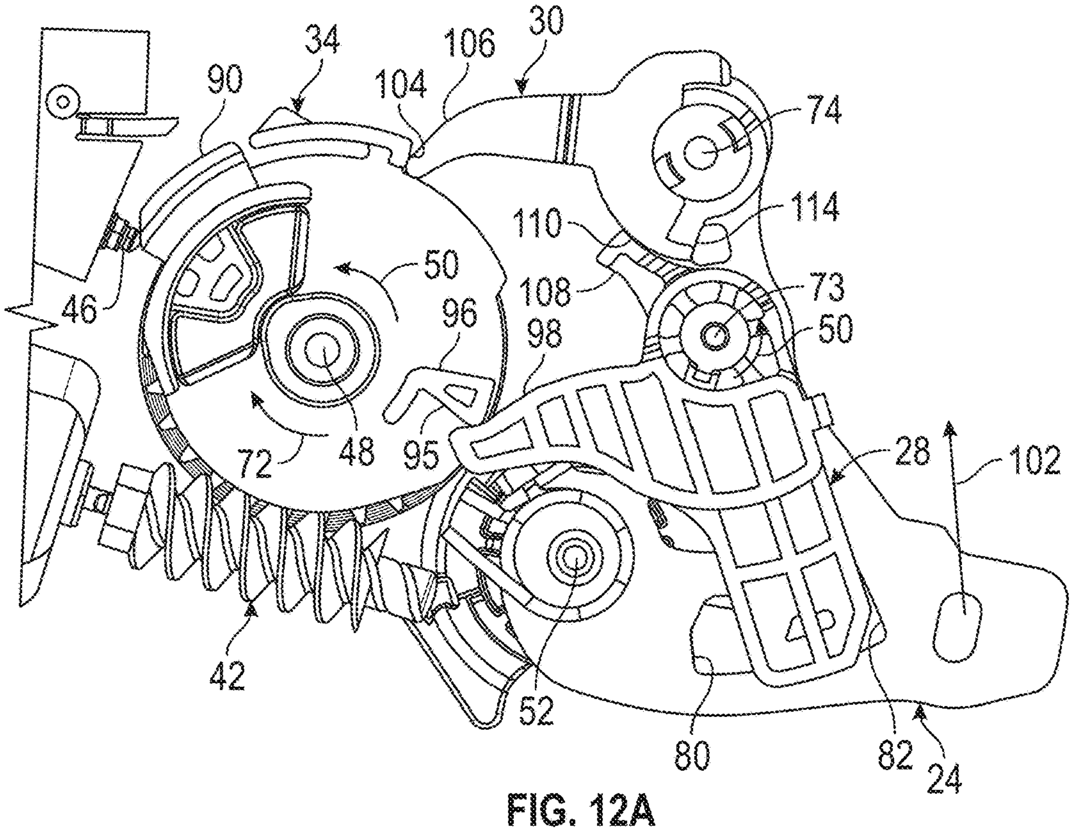
FIG. 12A is a partial plan view of the two-pull, automatic reset, latch system illustrated in the decoupled state and with the release lever of the two-pull, automatic reset, latch system manually rotated via the first pull by about six degrees thereby facilitating a block-out transition of a coupling lever of the two-pull, automatic reset, latch system.
Figure 12B:
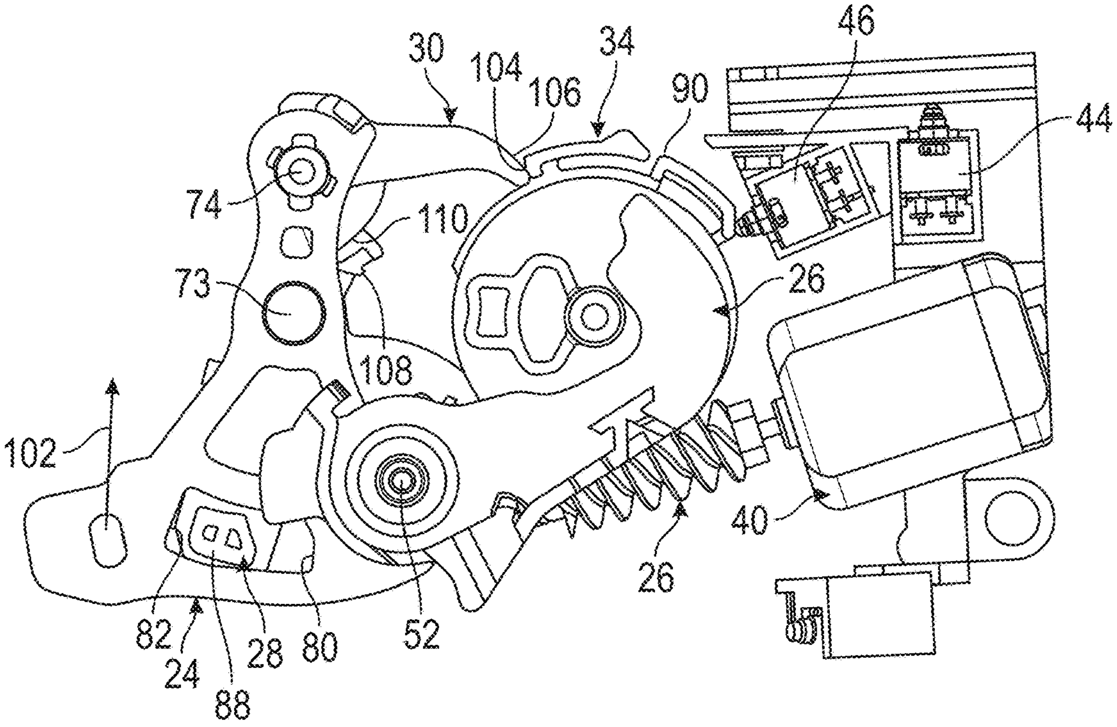
FIG. 12B is a partial plan view similar to FIG. 12A but viewing from an opposite side.

Referring to FIGS. 12A and 12B, continued rotation of the release lever 24 in direction 50 (e.g., from about three degrees to about six degrees) facilitates a block-out transition. More specifically, as the reset lever 34 is back-driven (i.e., in direction 50) via the contact of the distal end 106 of the override link 30 with the contact surface 104 of the reset lever 34, the reset lever 34 no longer blocks-out the coupling lever 28, because the extension 98 of the coupling lever 28 is now circumferentially spaced from the second tab 96 of the reset lever 34. Instead, the coupling lever 28 now becomes blocked-out by the override link 30. More specifically, a second radial extension 108 of the coupling lever 28 contacts, or abuts, a circumferential block-out surface 110 carried by the override link 30 and facing in a radially outward direction with respect to axis 74. It is understood that the term "back-driving" is the mechanical rotation of the gear with the gear rotating the worm gear 42 and the motor 40. The term "driving" means that the motor 40 is being provided electric power to drive the work gear 42 and the gear 32.

Figure 13:
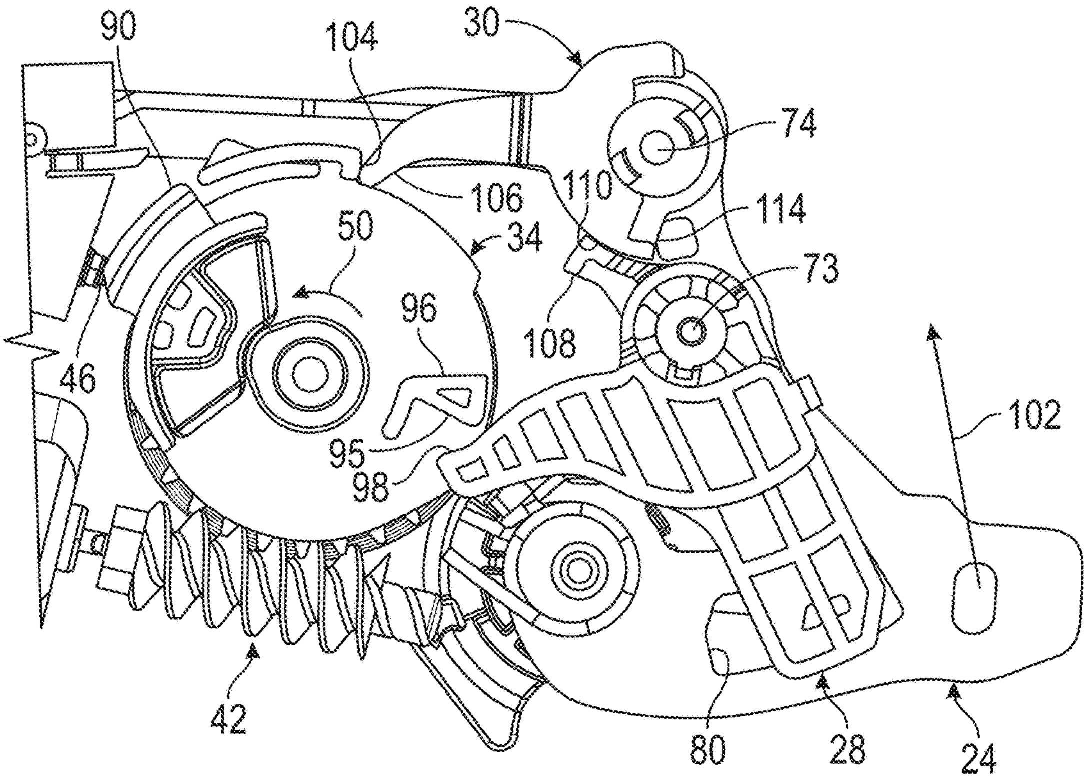
FIG. 13 is a partial plan view of the two-pull, automatic reset, latch system illustrated in the decoupled state and with the release lever of the two-pull, automatic reset, latch system manually rotated via the first pull by about nine degrees thereby causing a gear home switch of the two-pull, automatic reset, latch system to activate.

Referring to FIG. 13, continued rotation of the release lever 24 in direction 50 (e.g., from about six degrees to about nine degrees) causes the gear home switch 46 to activate as it rides upon the extrusion 90 of the reset lever 34. At this point, the coupling lever 28 remains blocked-out, and the system 20 is in the decoupled state.

As best shown in FIG. 12A, spring 100 affects the override link 30 and the coupling lever 28. With respect to the view of FIG. 12A, the spring 100 biases the coupling lever 28 towards a clockwise direction, and the override link 30 to the counter-clockwise direction.

Referring again to FIG. 1, during a power scenario, and after the gear home switch 46 sends the signal 61 to the controller 52 upon a partial first pull, the timer 55 is initiated. If the first pull is not fully completed, and the auto reset switch 44 is not actuated, before expiration of the preprogrammed time period, the controller 53 sends the command signal 63 to the motor 40. The motor 40 may then drive the gear 32 to a home position. It is contemplated and understood that the gear home switch 46 and controller 53 may also be configured to de-energize the motor 40 during an auto reset event to avoid stalling the motor 40 against a hard stop.

Figure 14:
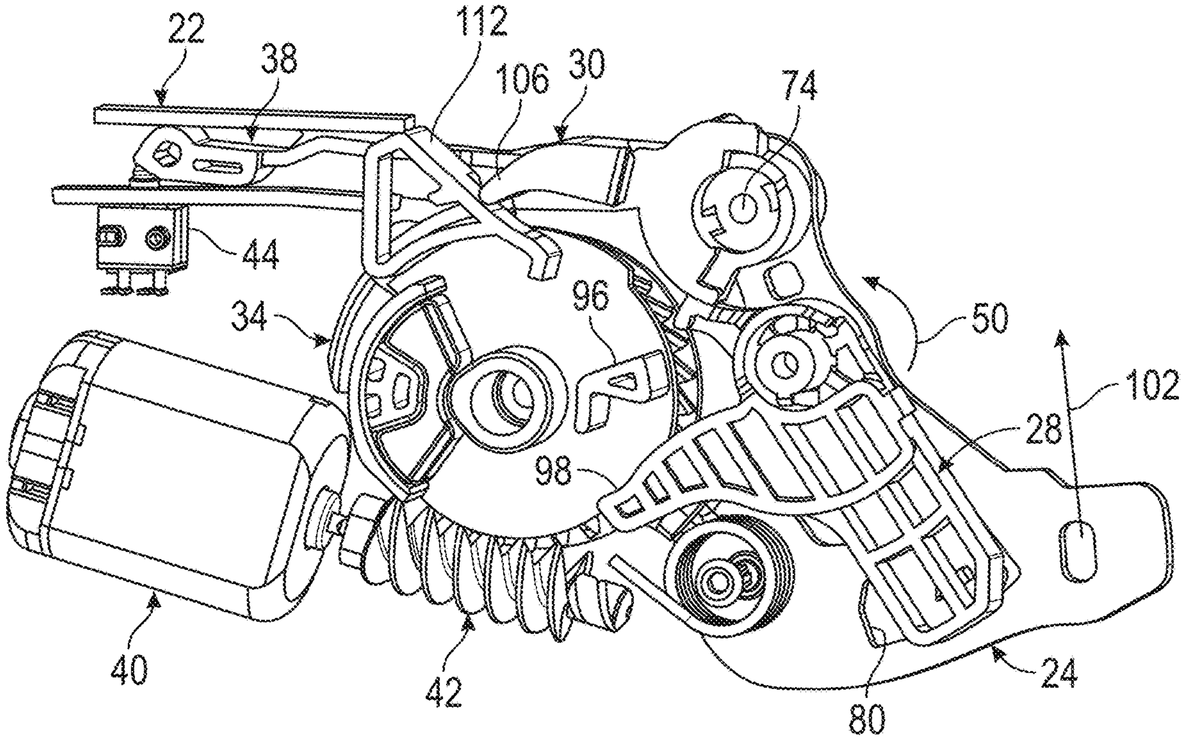
FIG. 14 is a partial plan view of the two-pull, automatic reset, latch system illustrated in the decoupled state and with the release lever of the two-pull, automatic reset, latch system manually rotated via the first pull by about twenty degrees thereby facilitating release of the override link from the reset lever.

Referring to FIG. 14, continued rotation of the release lever 24 in direction 50 (e.g., from about nine degrees to about twenty degrees) causes the distal end 106 of the override link 30 to ride upon a ramp feature 112 of the housing 22. This sliding contact causes the override link 30 to pivot about axis 74 in rotation direction 72, against the biasing force of spring 100, and until the distal end 106 radially clears the contact surface 104 of the reset lever 34. In this way, the override link 30 is disengaged from the reset lever 34. At this point, the coupling lever 28 remains blocked-out, and the system 20 is in the decoupled state (also see FIG. 18).

Referring to FIG. 15, continued rotation of the release lever 24 in direction 50 (e.g., from about twenty degrees to about twenty-two degrees) causes the switch link 38 to move over, and activate, the auto reset switch 44. At this point, the coupling lever 28 remains blocked-out (i.e., extension 108 is in contact with surface 110), and the system 20 is in the decoupled state.

Activation of the auto reset switch 44 effects a signal to the motor 40 that drives the gear 32 in the direction 72. As the gear 32 rotates in direction 72, the gear 32 carries the reset lever 38 with it until the tab 96 is, once again, in contact with the distal end of the extension 98 of the coupling lever 28.

Referring to FIG. 16, continued rotation of the release lever 24 in direction 50 (e.g., from about twenty-two degrees to about twenty-eight degrees) continues to block-out the coupling lever 28 keeping the system in a decoupled state. The override link 30 cannot back-drive the reset lever 34 until the override link 30 returns home. The override link 30 is adapted to keep the coupling lever 28 blocked-out until the reset lever 34 reaches about twenty-eight degrees of travel. The additional six degrees of travel provides a time window for the system to automatically reset, before the coupling lever 28 becomes unblocked, and the system cannot become coupled until the coupling lever is unblocked fully. FIG. 16 illustrates an orientation (i.e., about twenty-eight degrees of travel) where the override link 30 does not block-out the coupling lever 28 during a no-power scenario.

Figure 17:
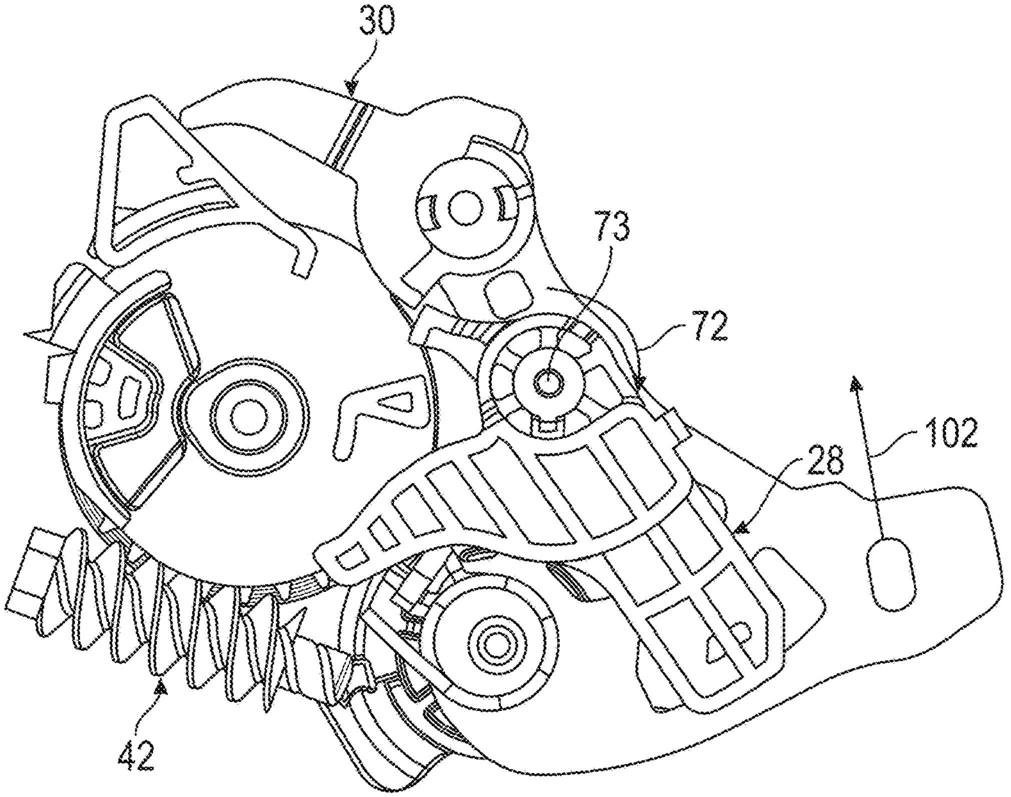
FIG. 17 is a partial plan view of the two-pull, automatic reset, latch system during a no-power scenario and an auto reset mode 'off' condition, and with the release lever of the two-pull, automatic reset, latch system manually rotated via the first pull by about twenty-eight degrees, and with the coupling lever moving toward the coupled state.
Figure 18:
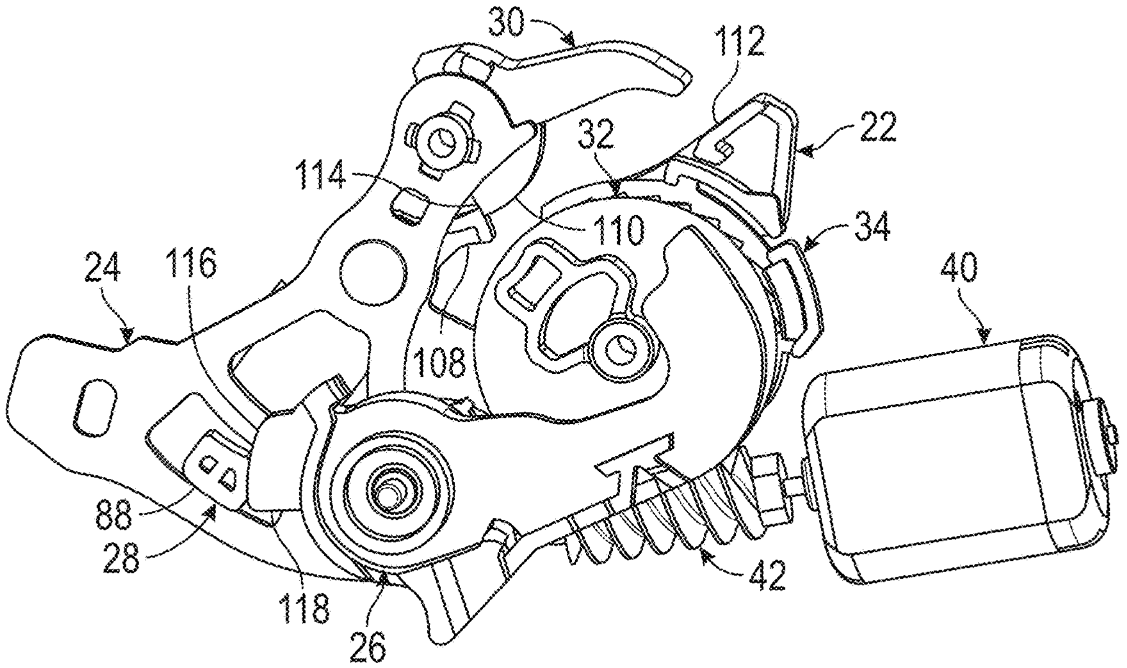
FIG. 18 is a partial plan view of the two-pull, automatic reset, latch system during the no-power scenario and the auto reset mode 'off' condition, similar to FIG. 17, and illustrating a member of the release lever in sliding contact with a power release lever of the two-pull, automatic reset, latch system.
Figure 19:
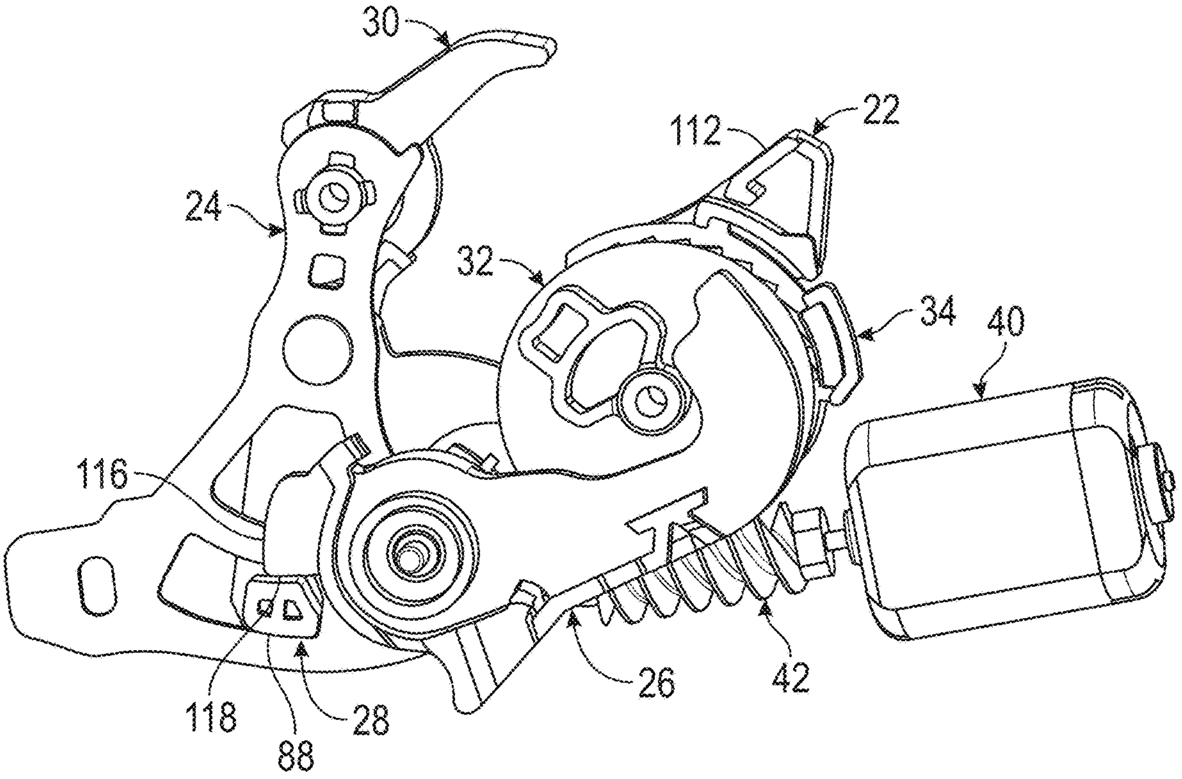
FIG. 19 is a partial plan view of the two-pull, automatic reset, latch system during the no-power scenario and the auto reset mode 'off' condition, similar to FIG. 18, and illustrating the end of the first pull and a coupled state.

Referring to FIGS. 17 through 19, during a no-power scenario and/or an auto reset mode 'off' condition, during a first pull attempt, the coupling lever 28 becomes unblocked by the override link 30 (e.g., at about twenty-eight degrees), and instead, the coupling lever 28 is free to rotate in direction 72 and blocks-out the override link 30. More specifically, extension 108 clears the surface 110 of the override link 30, rotates in the direction 72 about axis 73, and until the extension 108 abuts a circumferentially facing face 114 carried by the override link 30. This contact holds the distal end 106 of the override link 30 away from the reset lever 34. At about the same time, the member 88 of the coupling lever 28 becomes in sliding contact (see FIG. 18) with a circumferentially extending surface 116 with the power release lever 26, and until the member 88 engages the power release lever 26. This engagement is accomplished when the member 88 is in contact with a face 118 that faces in the circumferential, or rotation, direction 72 with respect to axis 52 (see FIG. 1 and FIG. 19). The coupling lever 28 is now in the coupled state with the release system 25. A second pull of a cable by a user, can now release the system 20.

The present system 20 can further provide additional functions depending on the system that it is applied to. Rotating the gear 32 in the opposite direction 72 (i.e., back-driven direction) may be used to provide additional functions that include, but are not limited too, power release of a latch, power locking, electronically switching between a first pull release and a second pull release (i.e., couples or decouples the system), power cinching, and others. The system 20 may also replace the traditional mechanical child locks in a latch. The system may disengage an inside handle similar to that of a child-lock system, but can be turned off by not driving the reset motor back to a decoupled condition. As well, the child locks may be turned on, or off, without requiring an additional actuator or components in the system. During a post-crash scenario, the system may provide the ability to either, switch to a first pull release, or to turn off the child locks. In one scenario, this may permit an individual in a backseat of the vehicle to escape if the front seat passenger is not available.

Referring now to FIGS. 20-24 components of another embodiment of the present disclosure are illustrated. In FIGS. 20-24 improvements to the previous embodiments are illustrated. For convenience, only the features of the components of the alternative features are illustrated in FIGS. 20-24. In other words, the components illustrated in FIGS. 20-24 may be incorporated in any of the previous embodiments.

As illustrated in FIGS. 20-24, additional embodiments of the auto reset actuator are illustrated. As mentioned above, a two-pull, automatic reset, latch system 20 is provided wherein the latch resets itself prior to the second pull.

Referring now to at least FIGS. 7, 8, 20, 20A and 21, the mechanical build-in spring 89 is removed from the reset lever 34. If the aforementioned spring 89 was made out of plastic it may be prone to deformation under extreme temperatures, that may compromise the auto reset actuator function. To compensate for this change, the reset lever 34 is now provided with a retention feature 200 for a new independent spring 202 for the inside release function. Retention feature 200 is proximate to or extends from the second tab 96 of the reset lever 34 that forms the block out surface 95. In one non-limiting embodiment, the spring 202 is a stainless steel spring.

Figure 20:
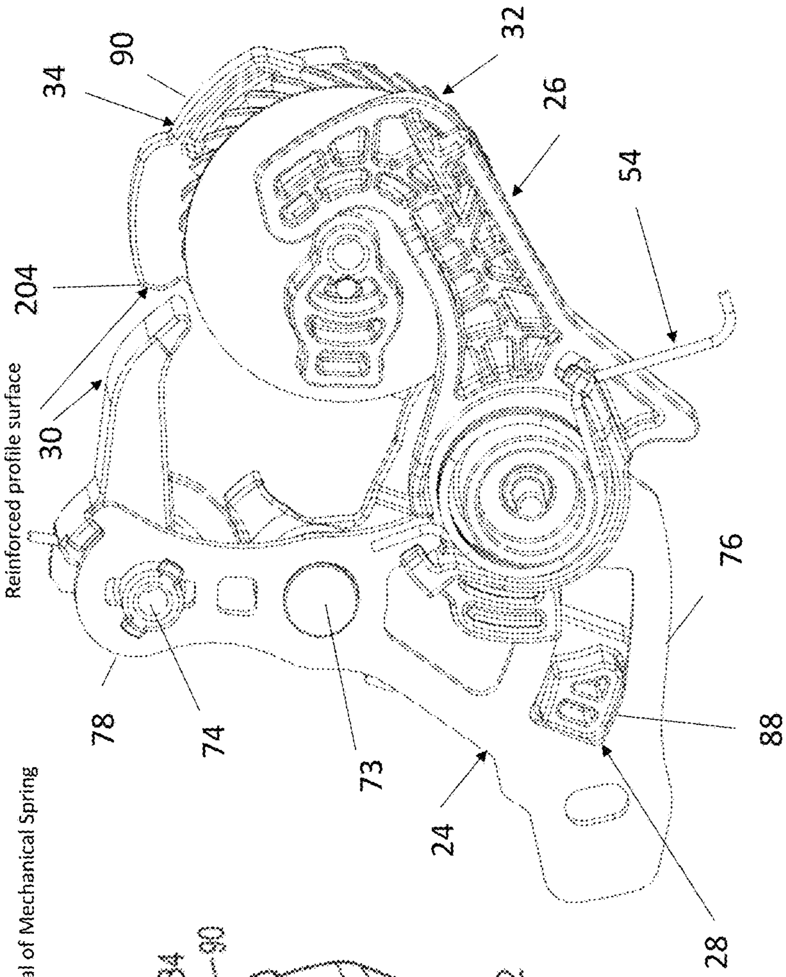
FIG. 20 is a partial perspective view of the two-pull, automatic reset, latch system of another embodiment illustrated in a decoupled state.
Figure 20A:
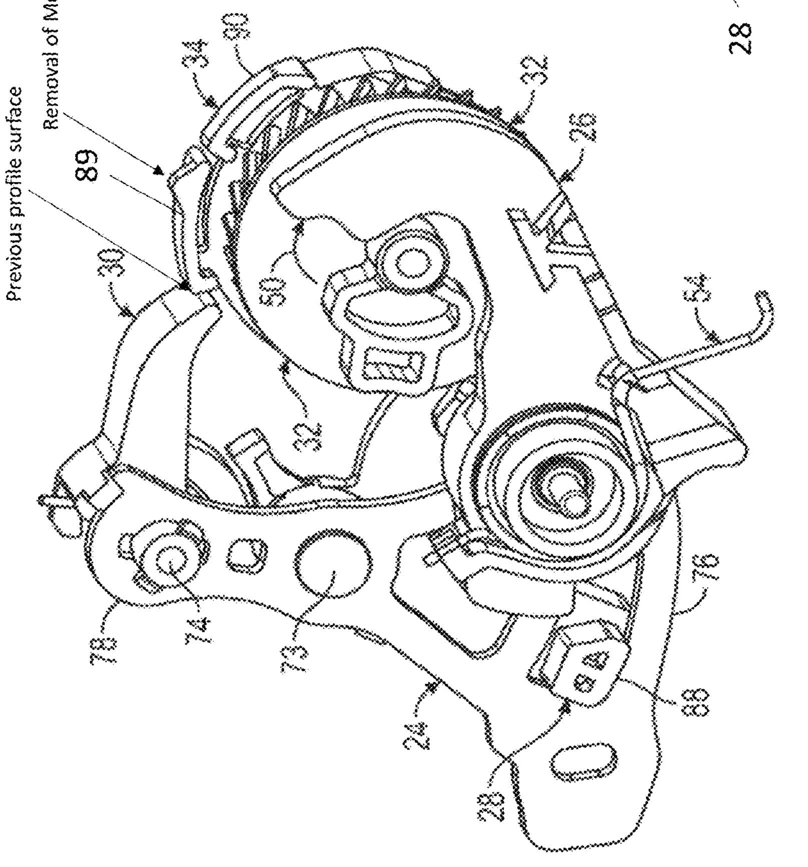
FIG. 20A illustrates portions of FIG. 7 that are changed in FIG. 20.
Figure 21:
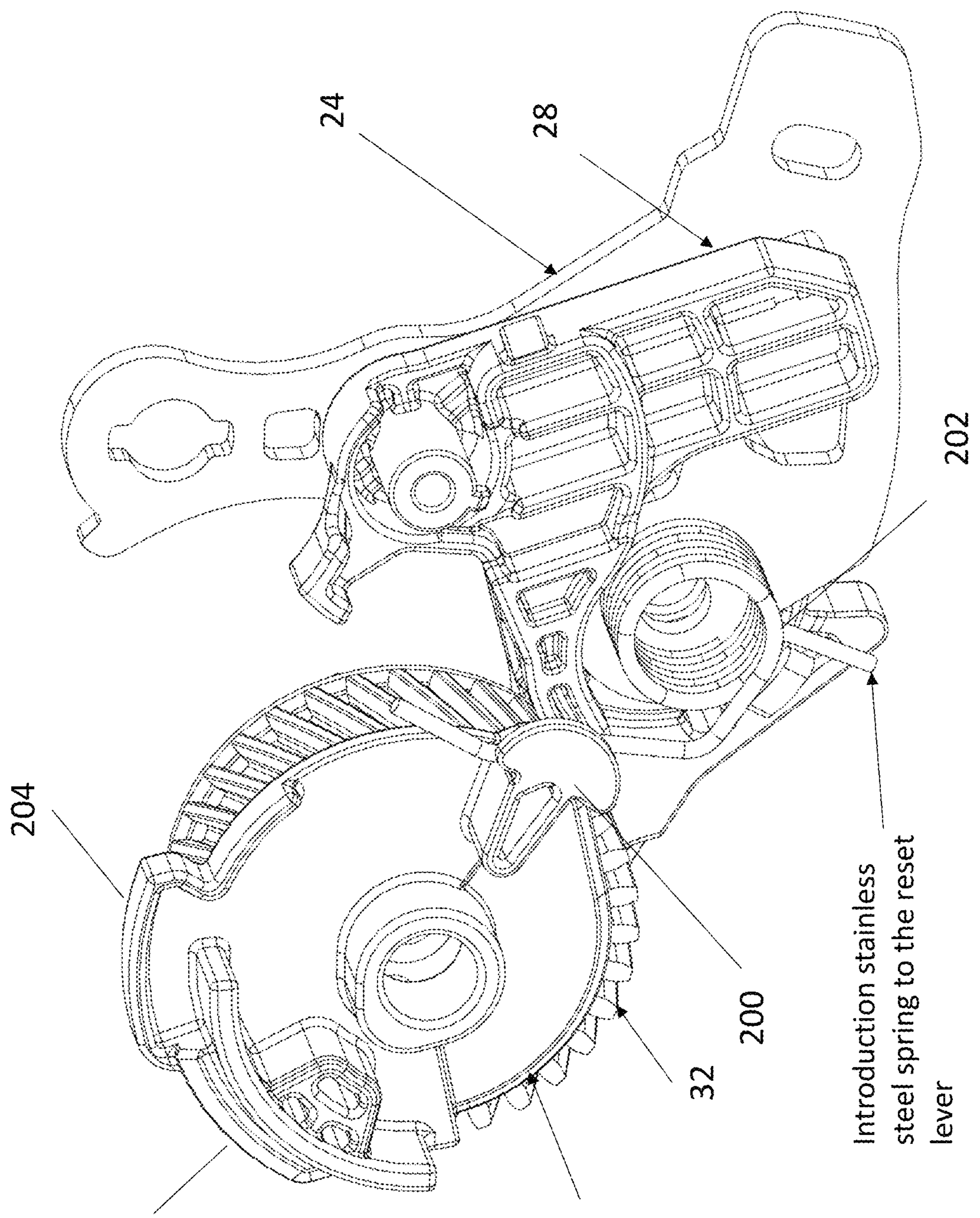
FIG. 21 is another partial perspective view of the two-pull, automatic reset, latch system of another embodiment illustrated in the decoupled state.

In addition, the reset lever 34 is provided with a reinforcement of the profile surface 104, which is now labeled 204, where the reset lever 34 first interacts with the override link 30, to prevent a bypass condition by increasing the contact area. The also allows for a smoother transition to the auto reset actuator disable position. FIG. 20A also shows the previous profile surface and mechanical spring 89 removed from the previous embodiments. In one non-limiting embodiment, the radial extrusion 90 of the reset lever 34 is integrally formed with the reinforcement 204 of the profile surface 104.

Figure 22:
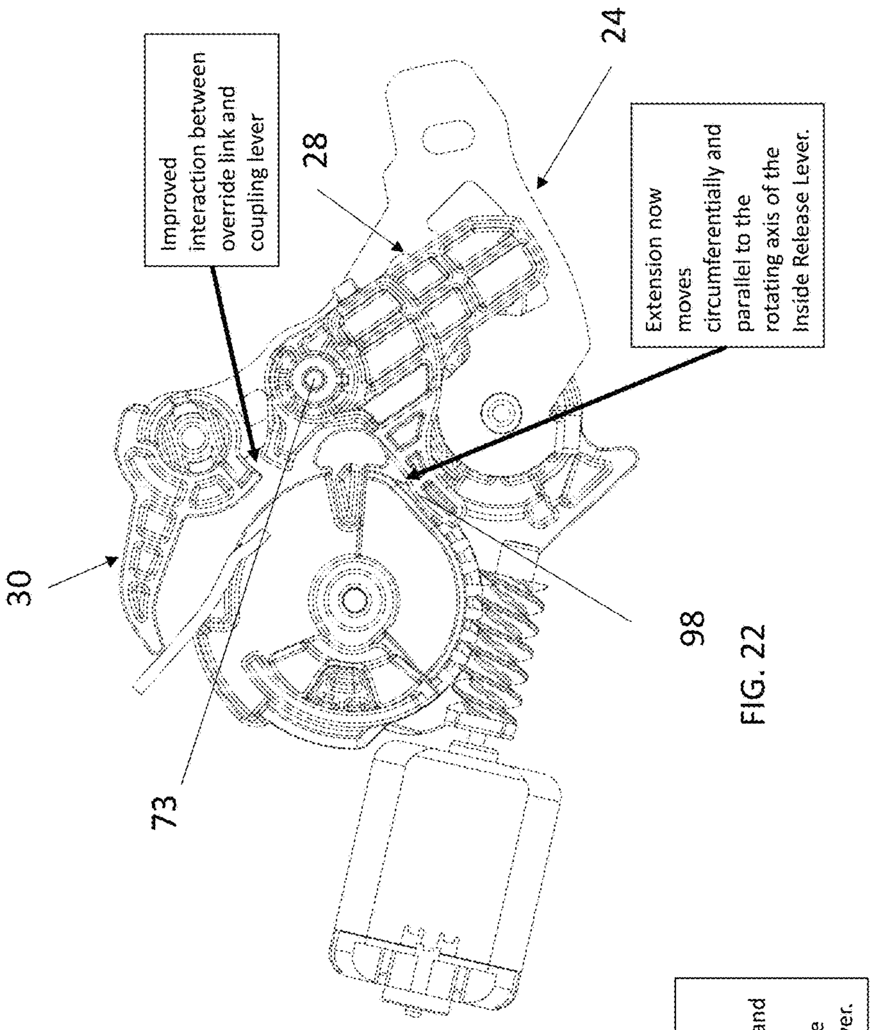
FIG. 22 is a partial plan view of the two-pull, automatic reset, latch system during a no-power scenario and an auto reset mode 'off' condition, and with the release lever of the two-pull, automatic reset, latch system manually rotated via the first pull by about twenty-eight degrees, and with the coupling lever moving toward the coupled state of another embodiment of the present disclosure.

Referring now to FIG. 22 additional material is added to the surface of the coupling lever 28 that interacts with the override link 30, which prevents a loss of bite between both these components when the auto reset mechanism is not activated or when pulling the handle, a second time (in the case of power loss).

In addition and as illustrated in at least FIG. 22 an enhancement of the tab or extension 98 that interacts with the reset lever 34 by the change of its rotation axis to communize with the inside release lever 24 and allow a smooth transition. This extension 98 is now moving circumferentially and parallel to the rotating axis of the inside release lever 24.

Figure 22A:
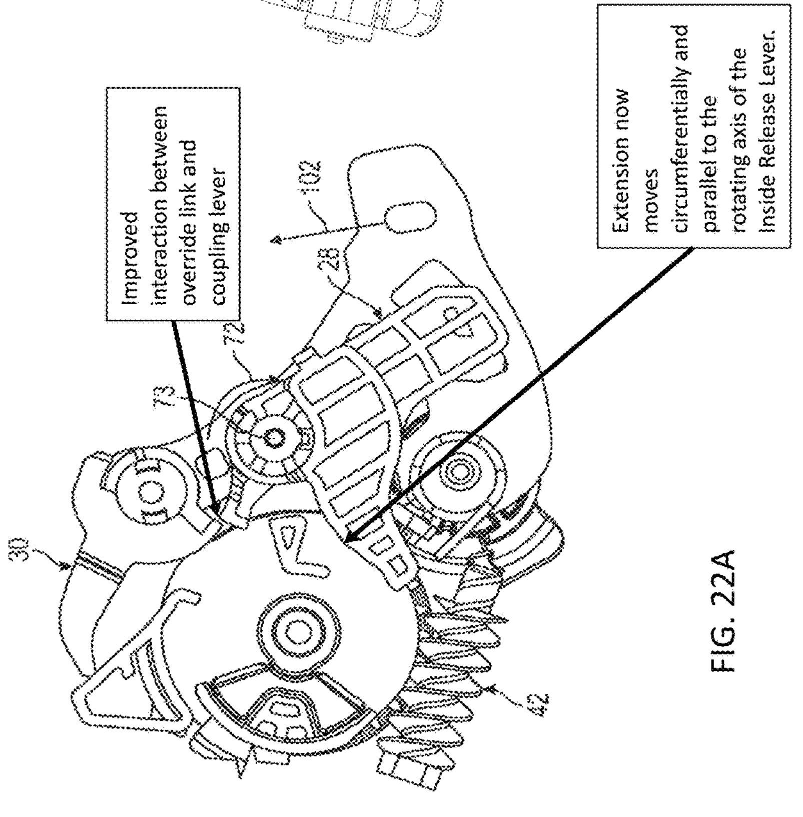
FIG. 22A illustrates portions of FIG. 17 that are changed in FIG. 22.

FIG. 22A illustrates the changes made in FIG. 22 with reference to FIG. 17.

Figure 23:
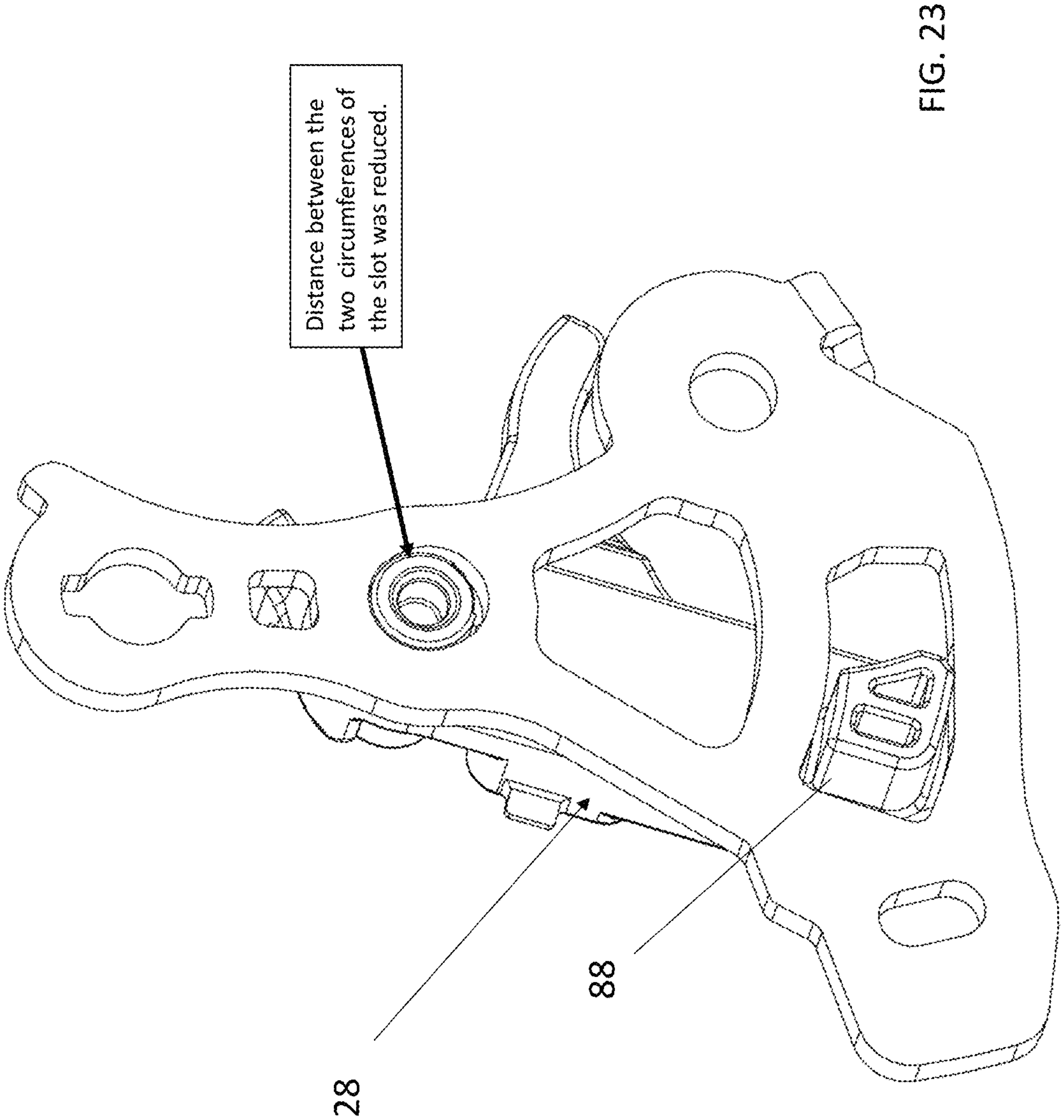
FIGS. 23 and 24 illustrate additional features of embodiments of the present disclosure.
Figure 24:
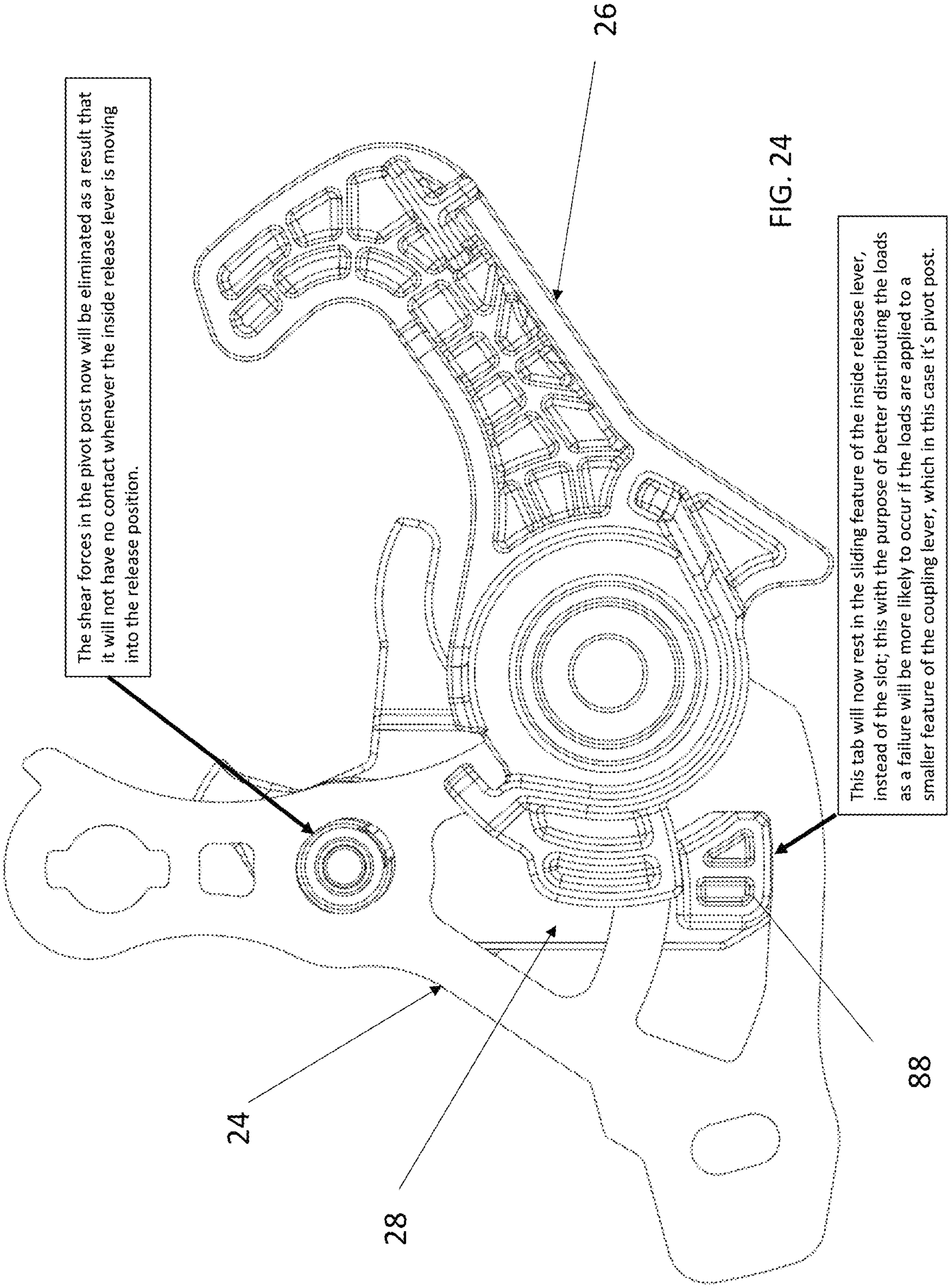
Figure 25:
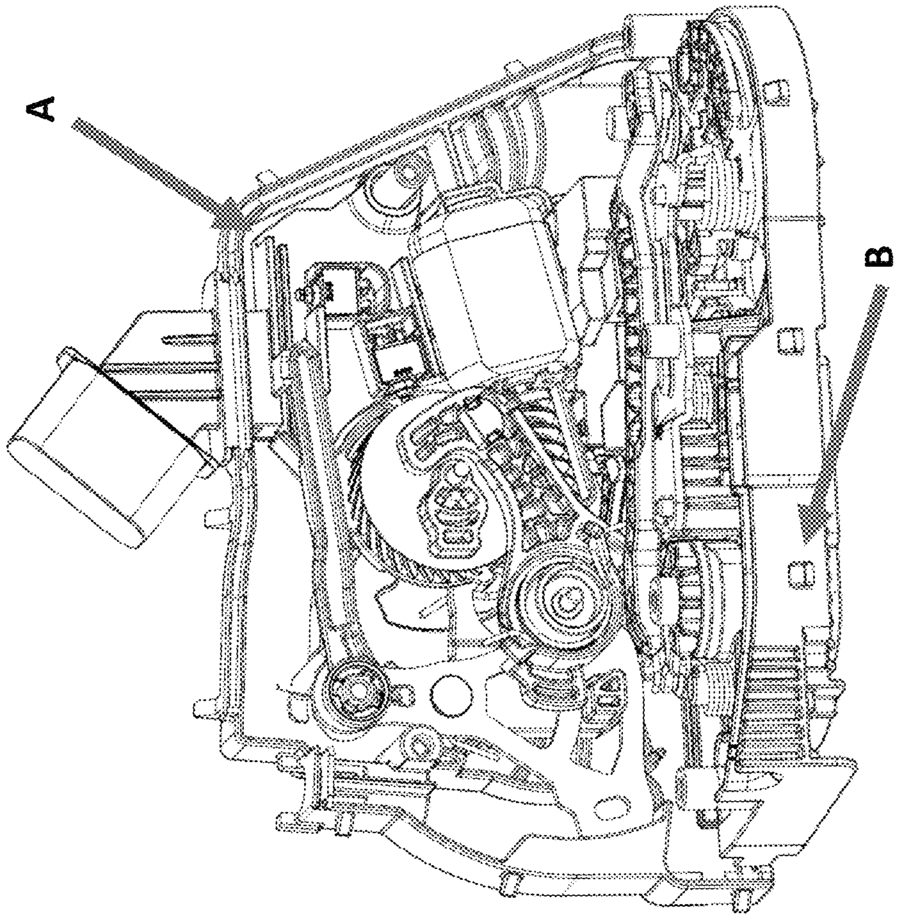
FIGS. 25-44 illustrate additional features of an embodiments of the present disclosure.
Figure 26:
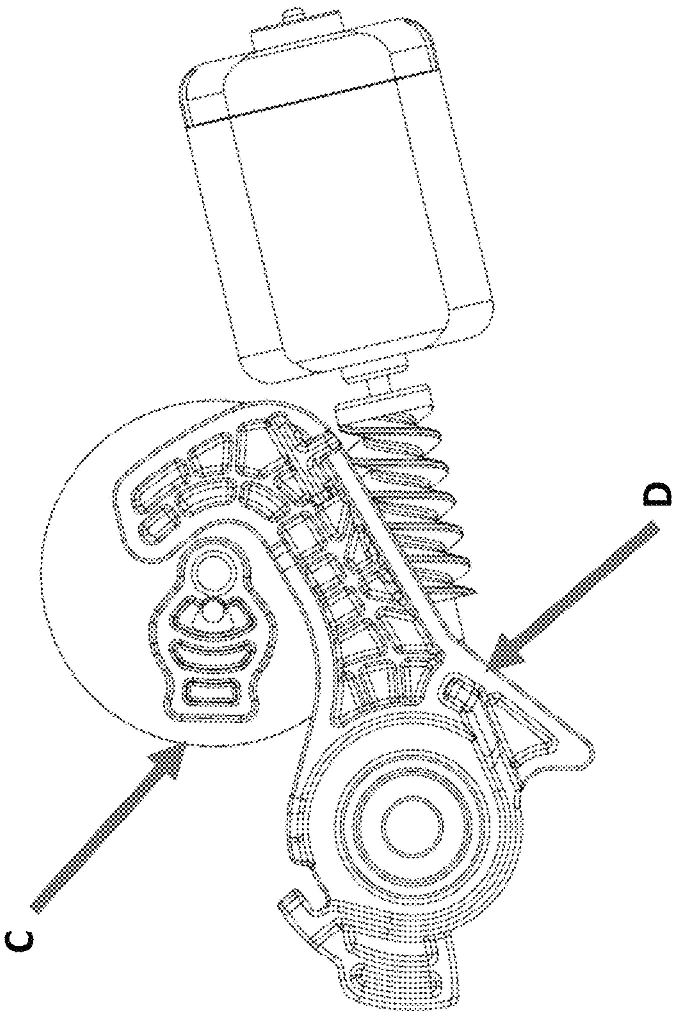
Figure 27:
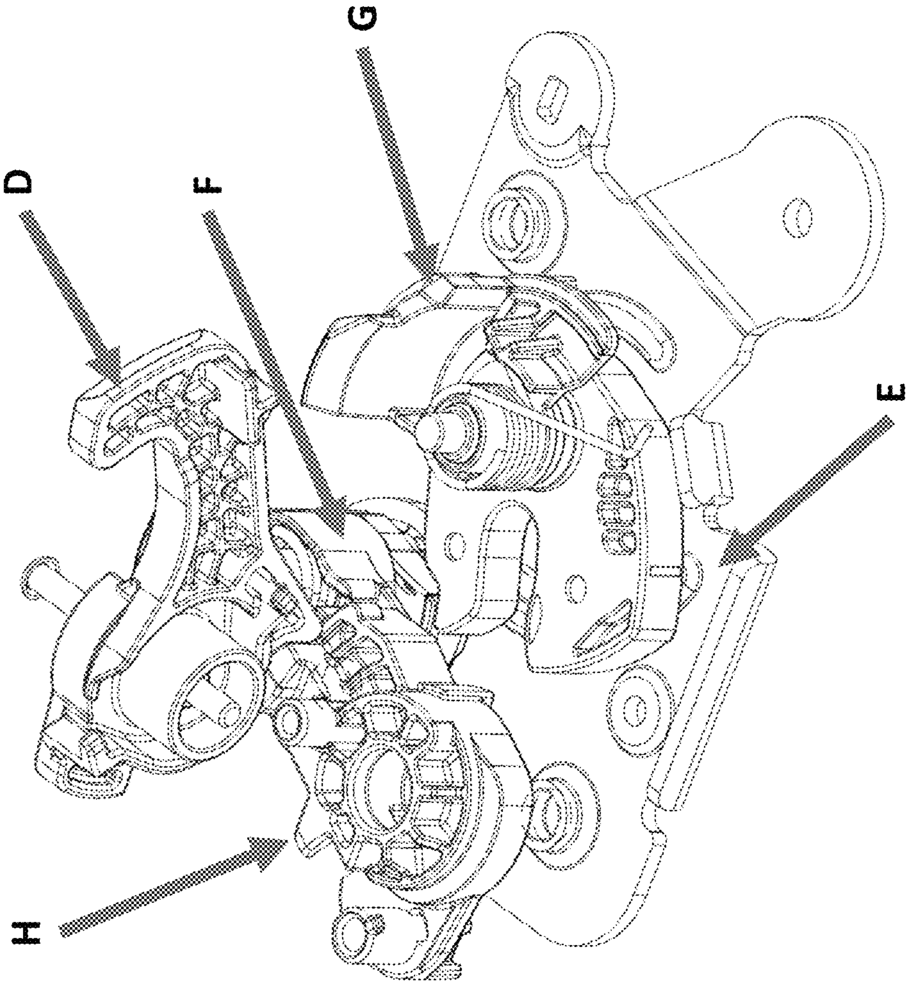
Figure 28:
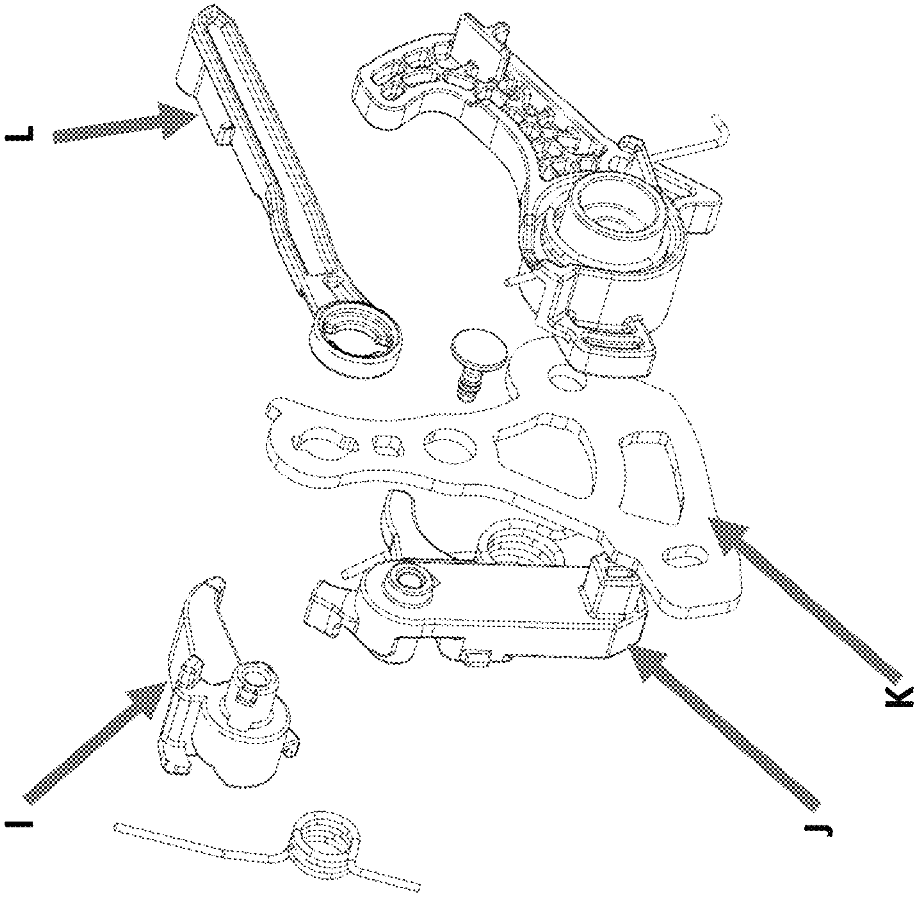
Figure 29:
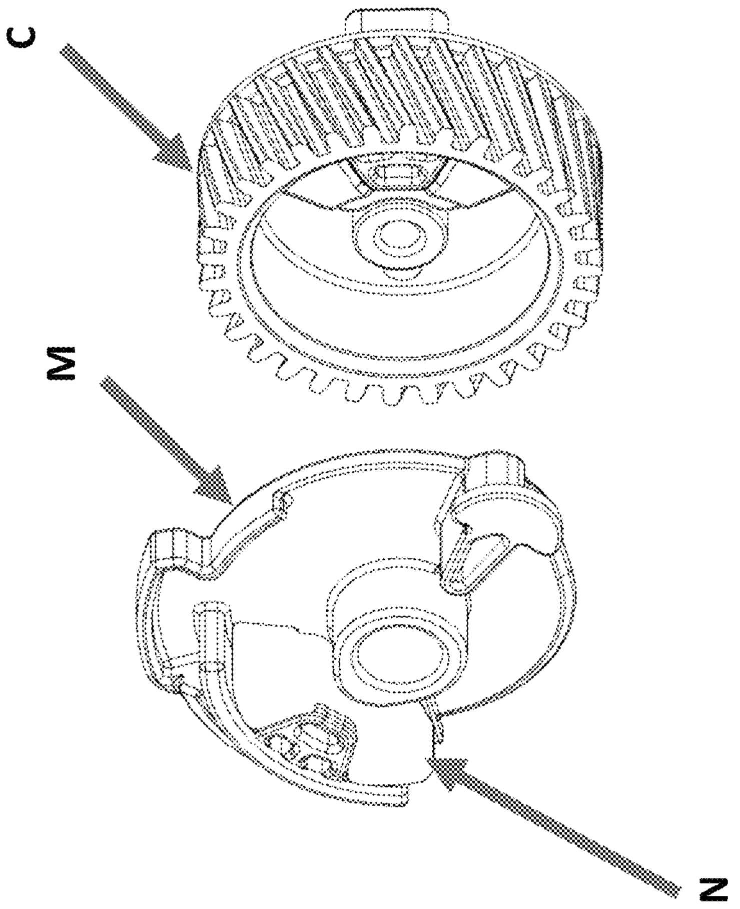
Figure 30:
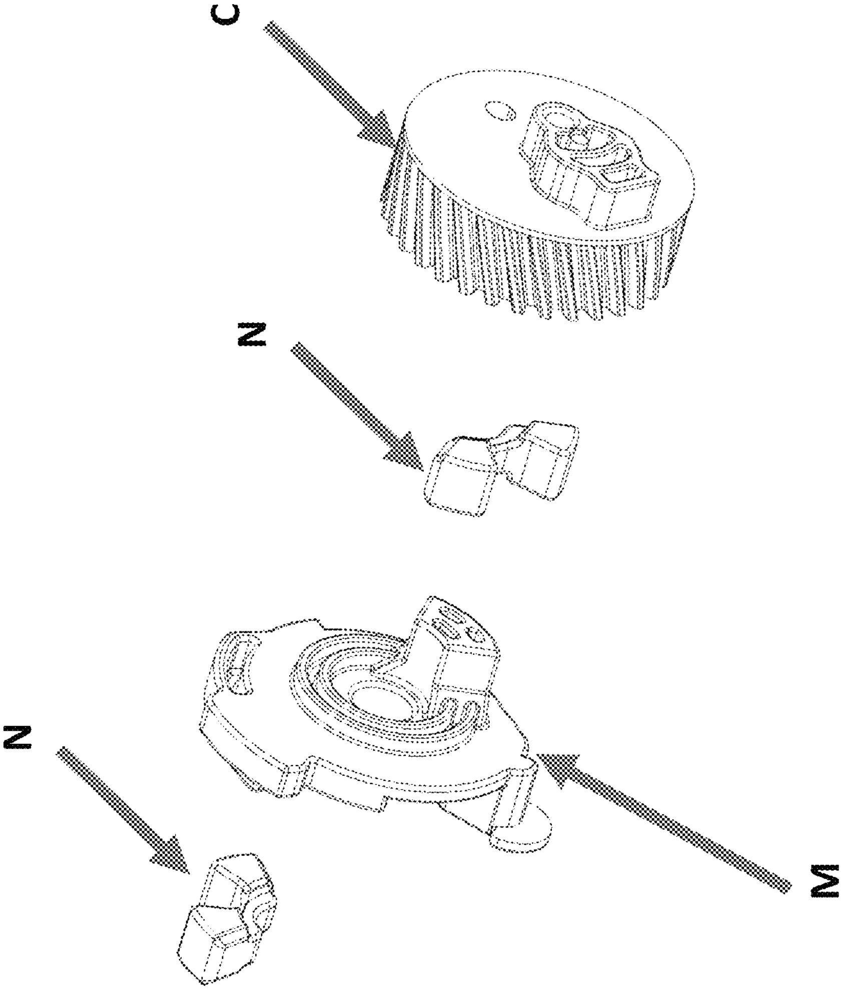
Figure 31:
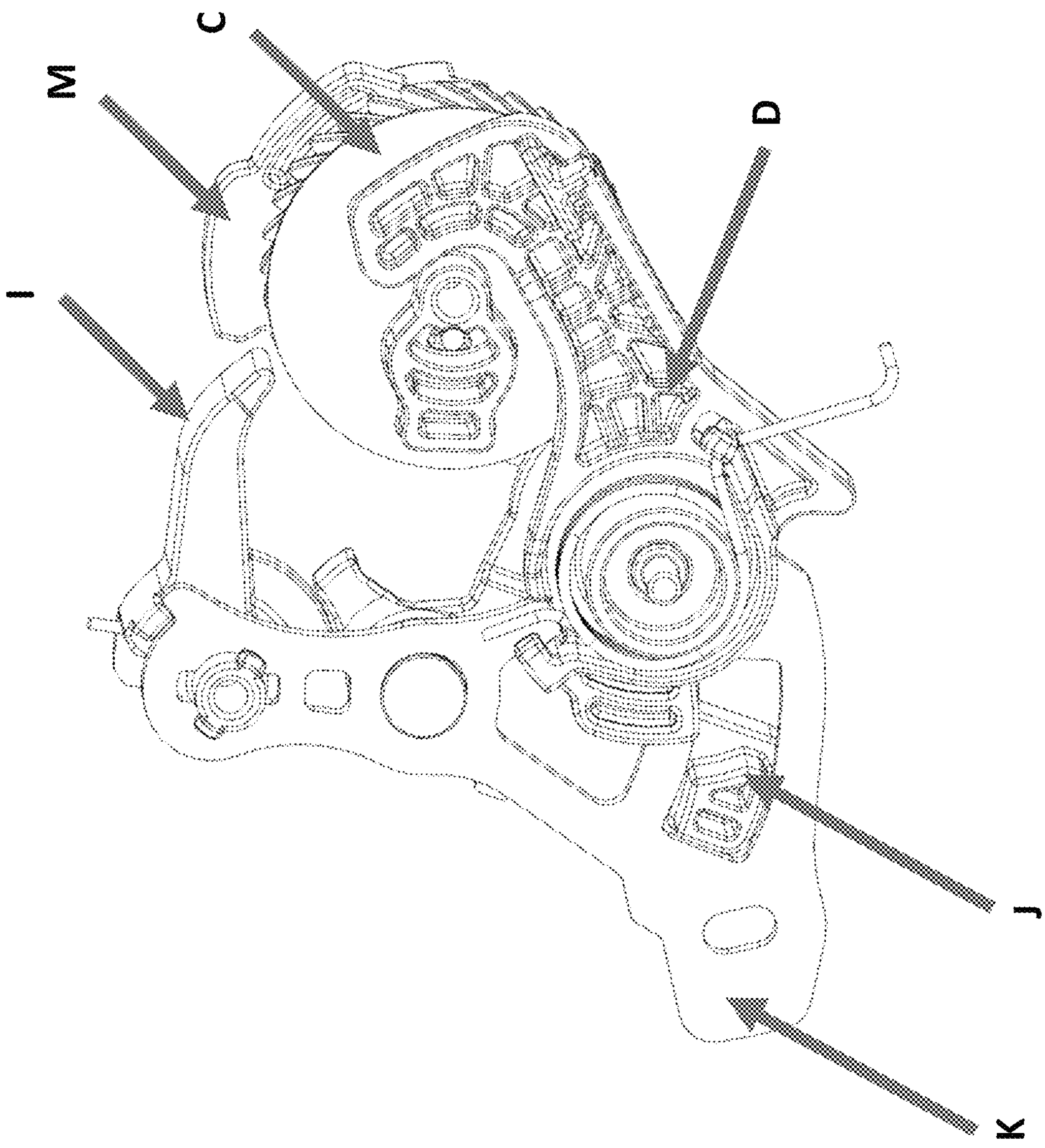
Figure 32:
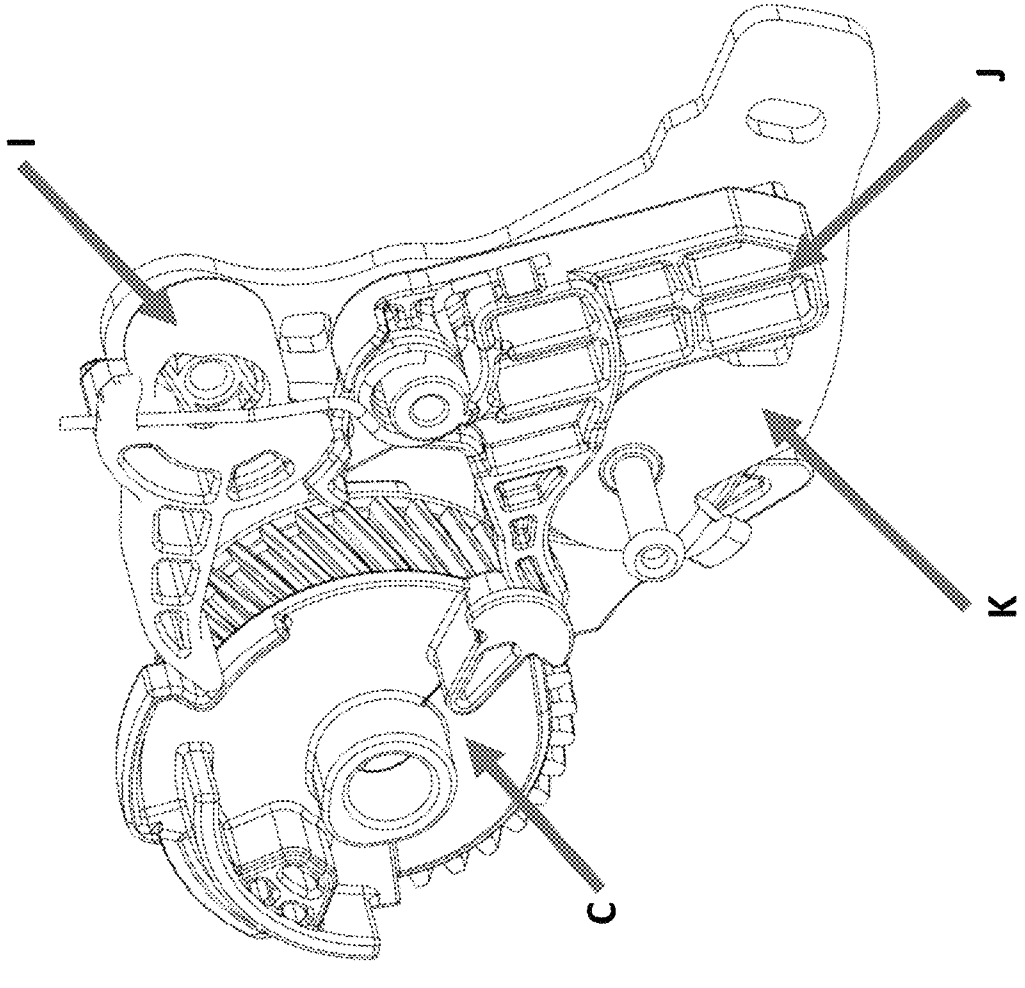
Figure 33:
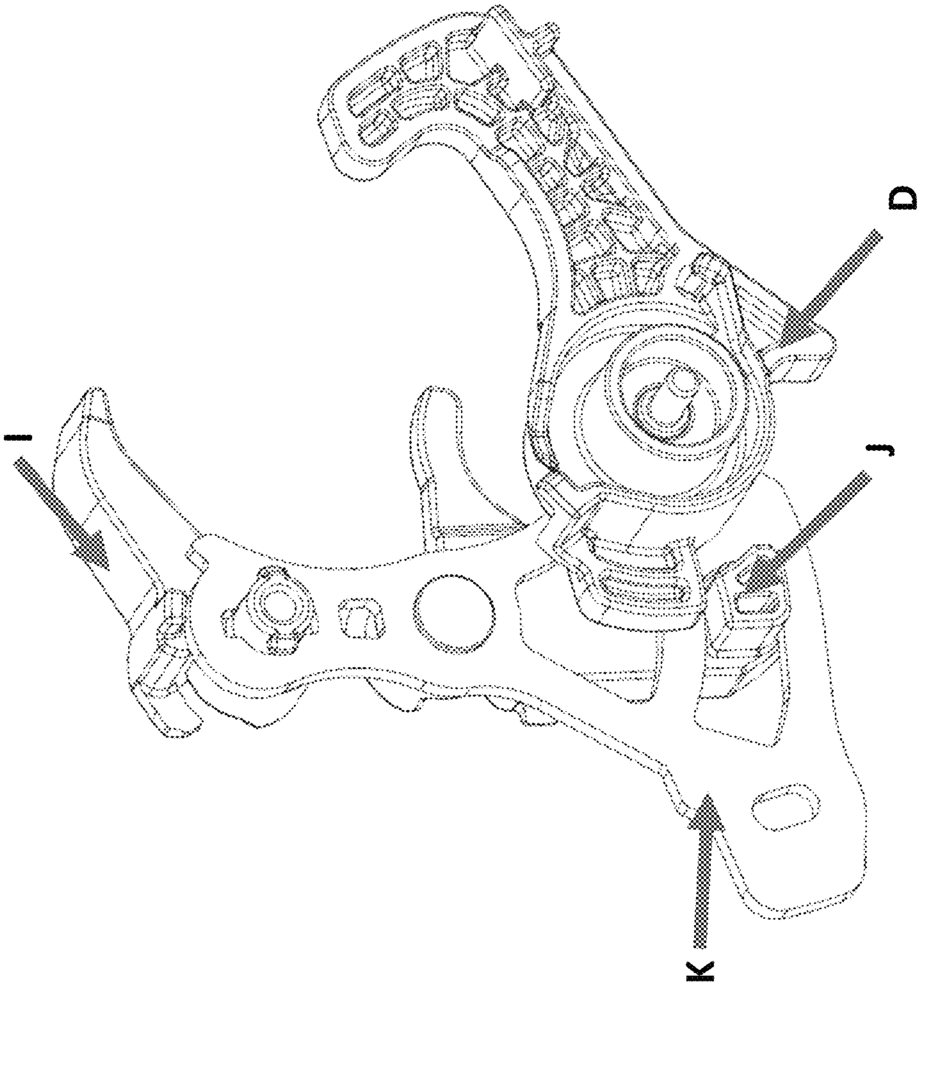
Figure 34:
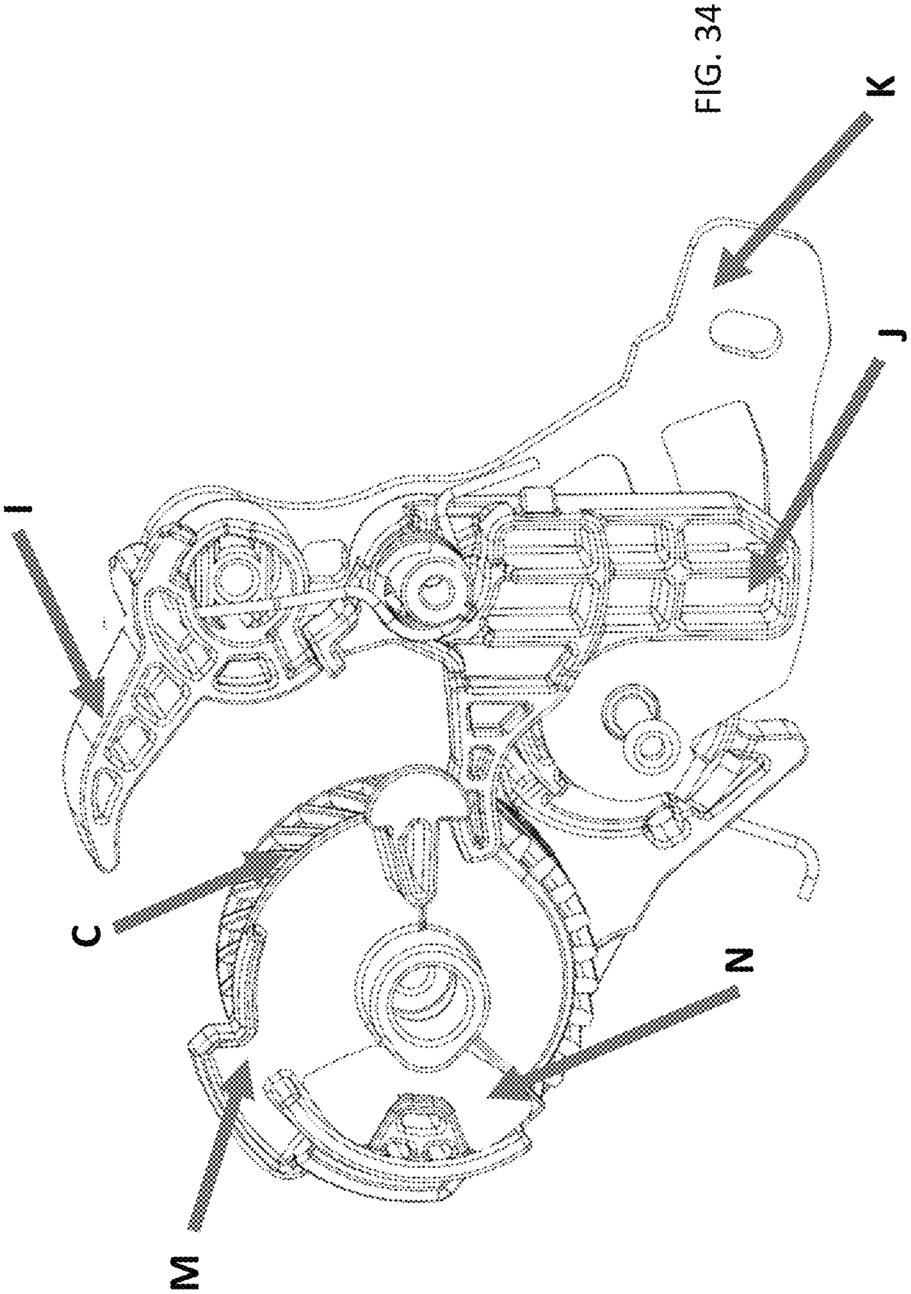
Figure 35:
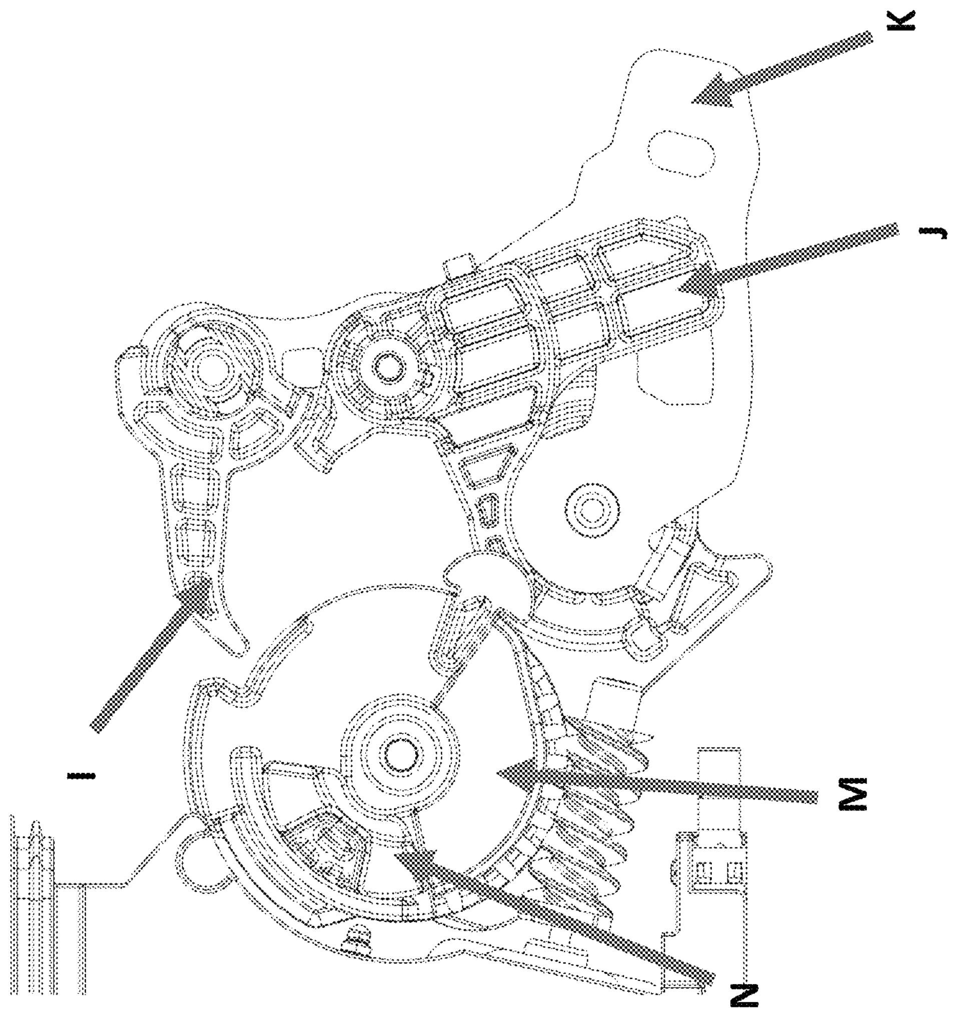
Figure 36:
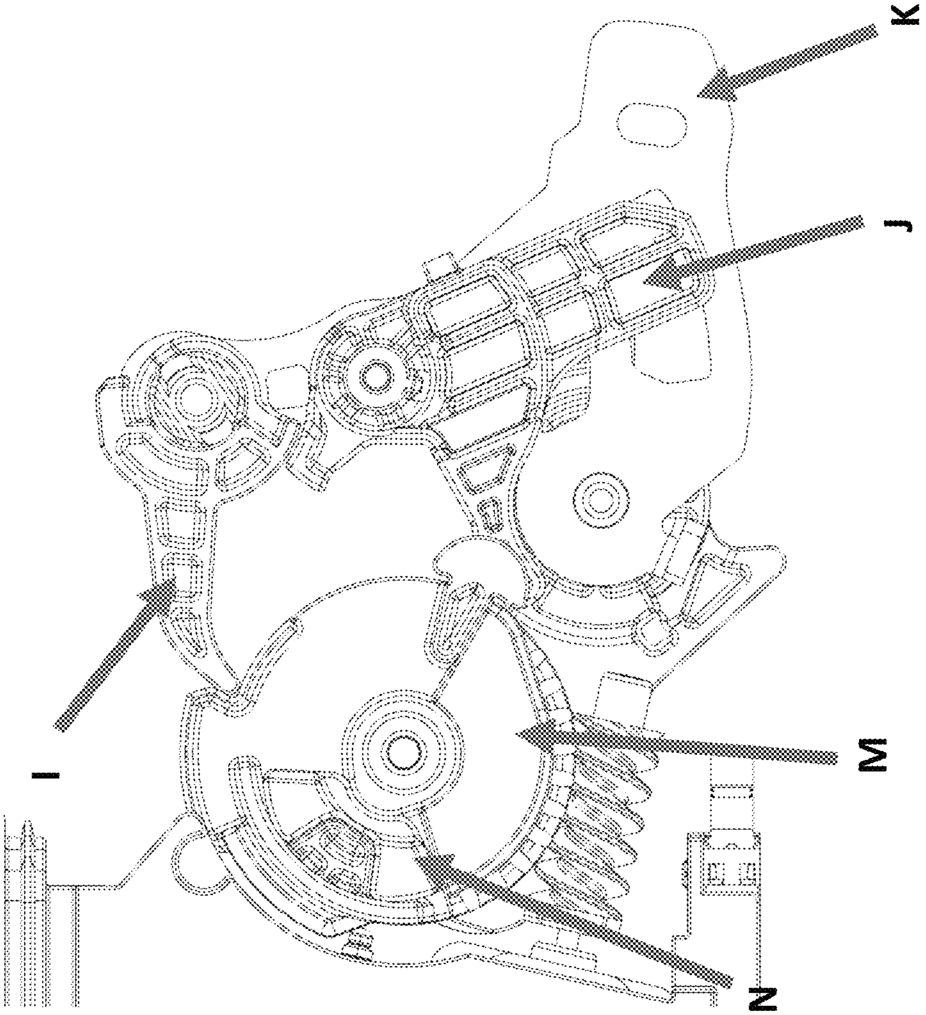
Figure 37:
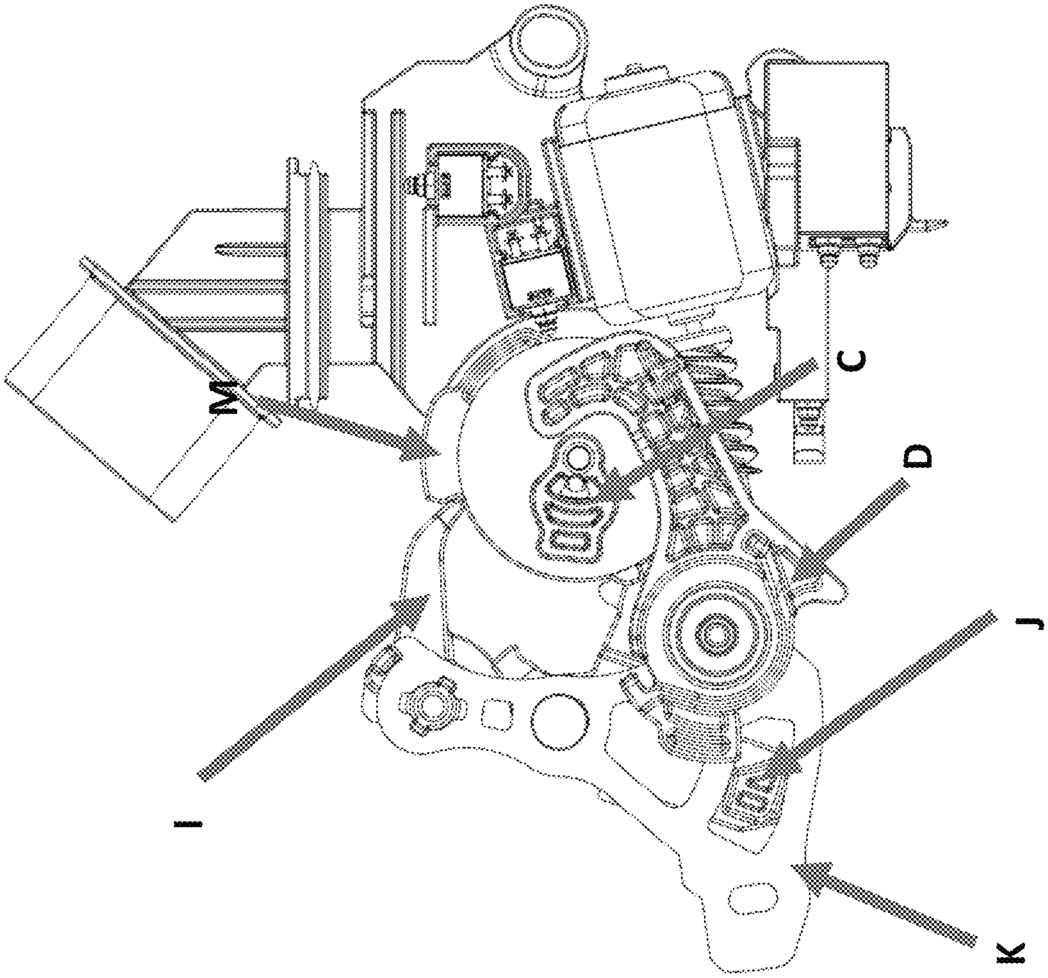
Figure 38:
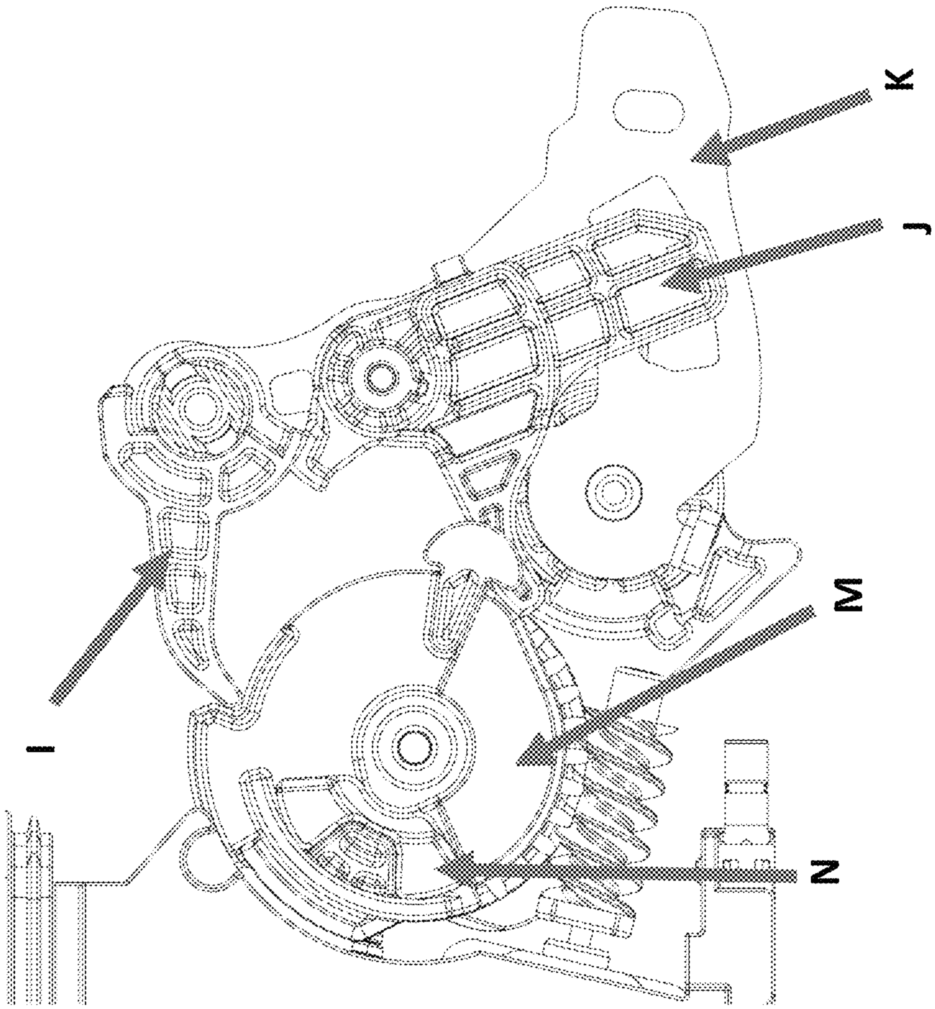
Figure 39:
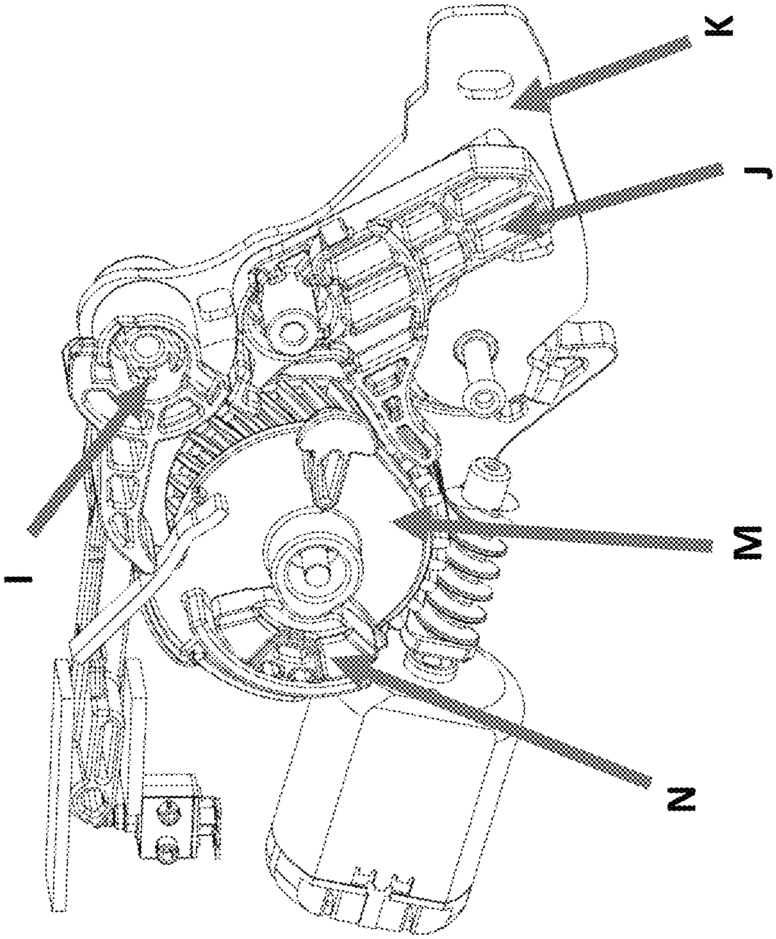
Figure 40:
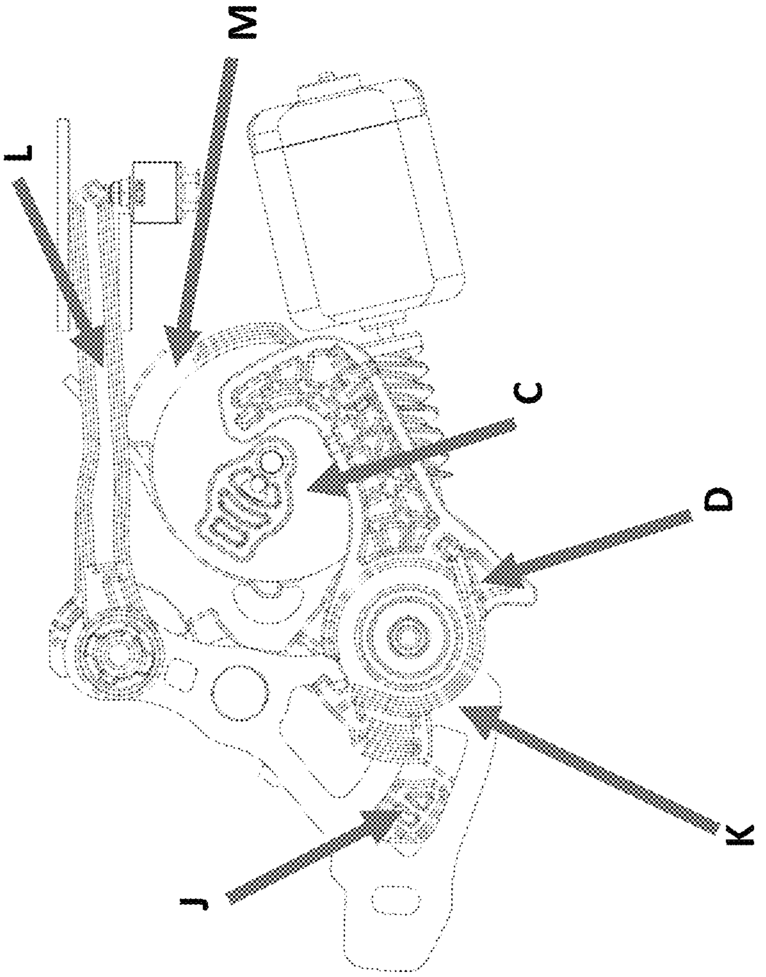
Figure 41:
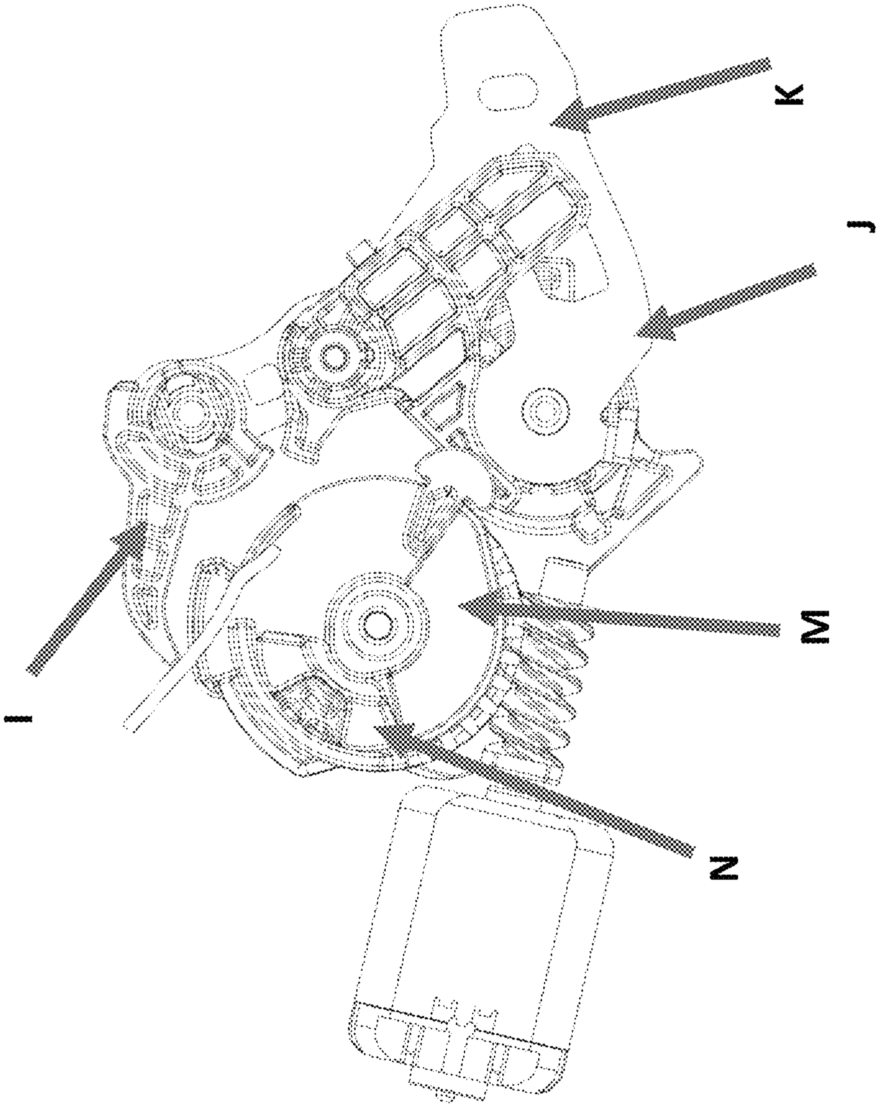
Figure 42:
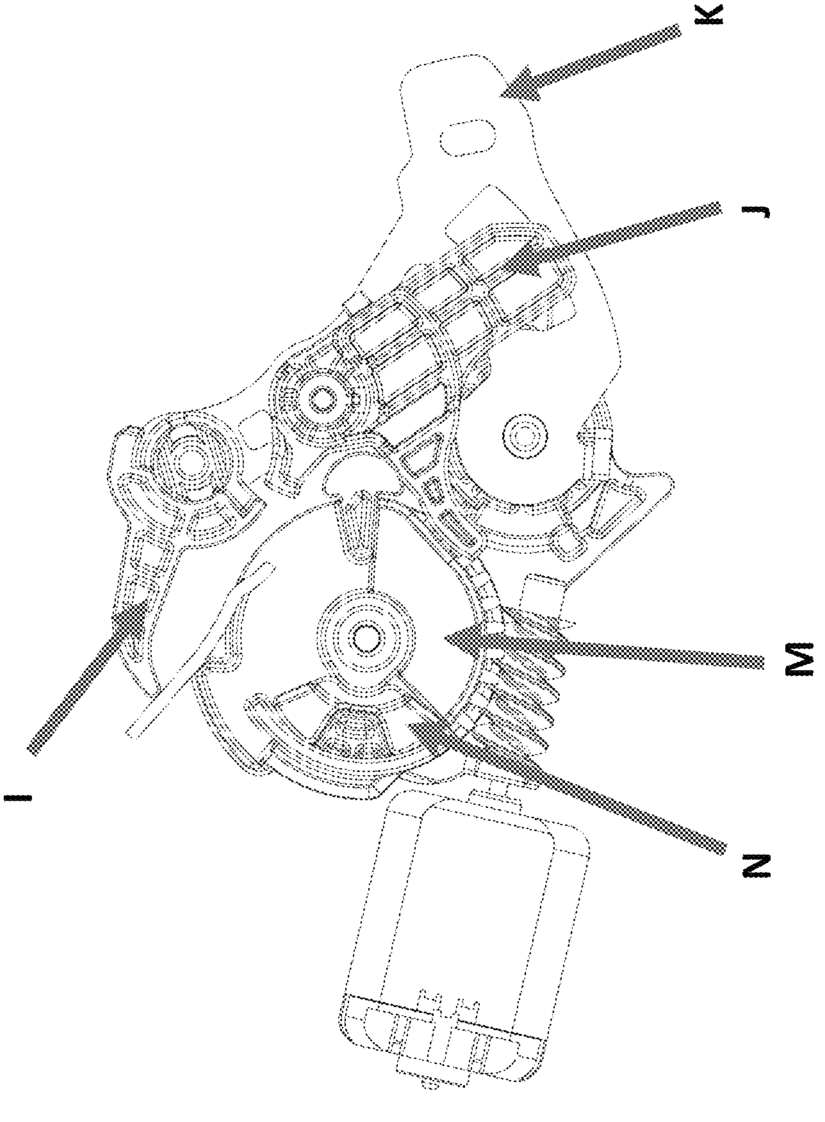
Figure 43:
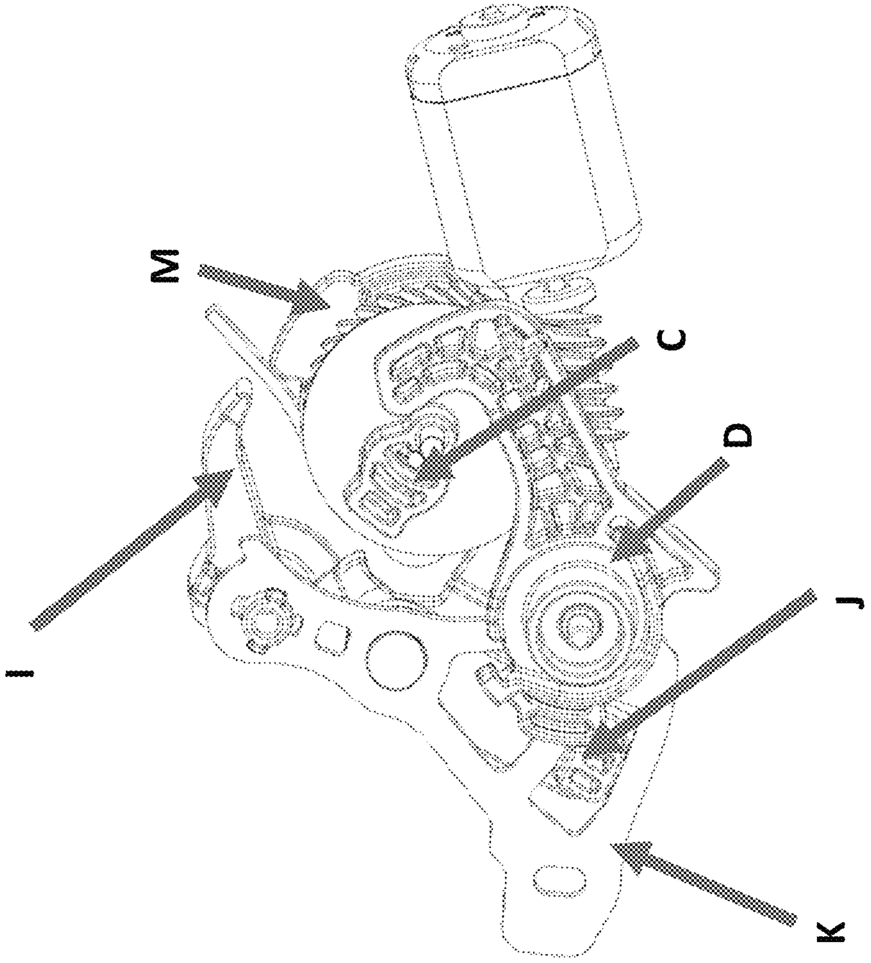
Figure 44:
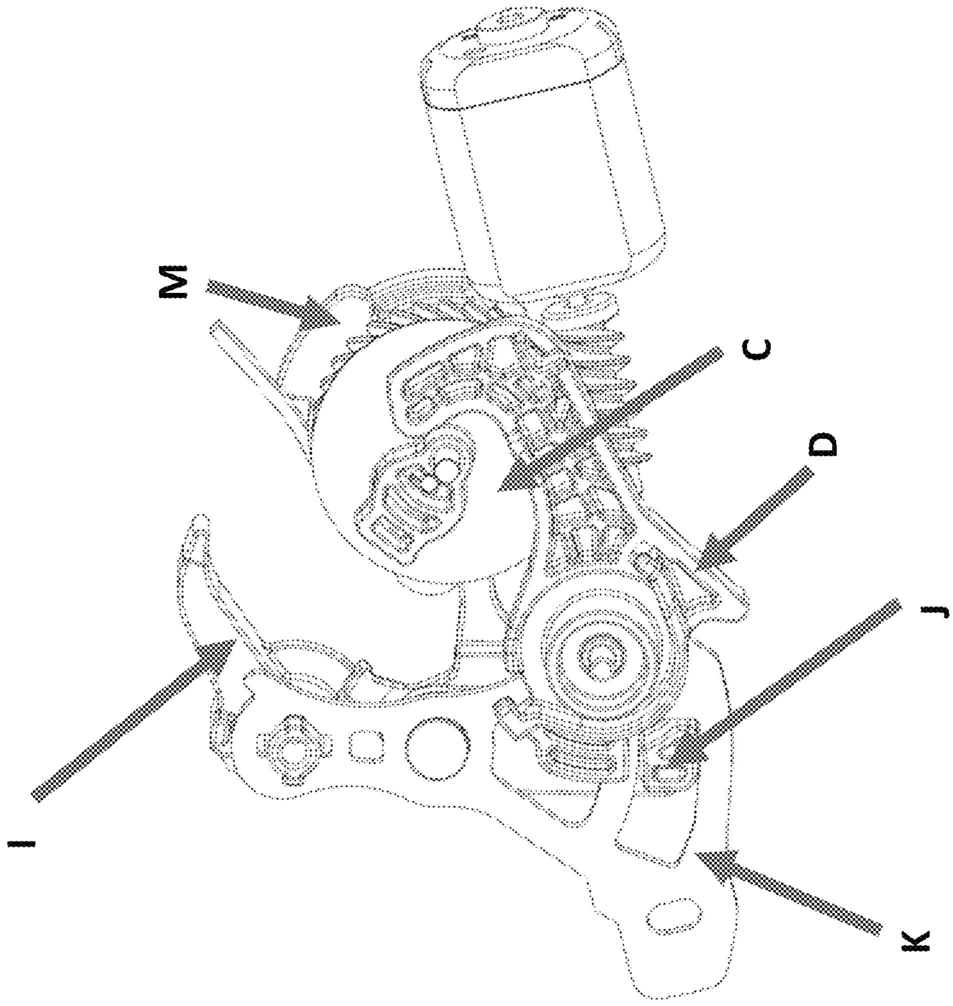

Referring now to at least FIGS. 23 and 24, the pivot located in the inside release lever 24, where the coupling lever 28 rotates on its axis is characterized for not having a circular shape but instead, a slot (two circumferences that are apart from each other). The distance between these two circumferences, and where the pivot post from the coupling lever 28 rotates, was reduced. Whenever a second pull is realized via the inside release lever 24 (whenever auto reset is disengaged or in an event of power loss) the tab 88 in the coupling lever 28 will go into an "engage" position; this in turn will move the power release lever 26 into an open position. This tab 88 will now rest in the sliding feature of the inside release lever 24, instead of the slot; this with the purpose of better distributing the loads as a failure will be more likely to occur if the loads are applied to a smaller feature of the coupling lever, which in this case is its pivot post.

Referring now to FIGS. 25-44 additional features of embodiments of the present disclosure are illustrated with reference to the following reference numerals:

A) Actuator Housing—The geometry of the actuator housing changed to accommodate a new electrical circuit carrier ECC, as well as a new latch housing which introduces a cinching mechanism for this latch. Also, it was reinforced by adding structure within the interior where the components are assembled as well as in the back of the housing to avoid any deformation that the power release or auto reset mechanism might trigger.

B) Latch Housing—The latch housing was increased in terms of size because of the addition of the cinching and override mechanism that the latch is introducing. Because of this, the latch was also reinforced by adding structural ribs all along the cinching cable portion to avoid any deformation. Another modification was the introduction of the pawl release lever pivot.

C) Power Release Gear—The power release gear changed its pitch and the lead angle of its teeth to accommodate a worm designed to be able to open at high seal loads. Also, to improve the stability of the gear in the power release function, the length of its teeth was increased to improve the alignment with the worm. Along with these changes, the cam surface where the gear interacts with the power release lever was changed for a new one that transmits the torque from the worm-motor to be able to open at extreme temperatures under high seal load scenarios.

D) Power release Lever—The power release lever changed in the area where it contacts the power release gear. This, to accommodate the changes in the cam profile and have a smooth transition when the latch performs the power release function.

E) Frame—The frame was modified to accommodate components that compose the cinching and override mechanism. For this, the frame was extended to include the pivot holes for the cinching overmold lever as well as the override lever. Also, because of the housing packaging, the frame geometry had a change.

F) Pawl Lifter—The pawl lifter was also modified to accommodate a power release mechanism that introduces the pawl release lever which acts as the first contact with the power release lever during the power release function, to consequently contact the pawl lifter which in turn moves the pawl, releasing the claw.

G) Cam Door Ajar—The cam door ajar lever was modified to accommodate the activation of the door open switch.

H) Pawl Release Lever—The pawl release lever was introduced into a mechanism to accommodate an emergency outside release system. This lever rotates on its pivot via the interaction with power release lever or an outside release mechanism as mentioned above.

I) Override Link Lever—The override link lever is modified in the profile where it interacts with the coupling lever when the auto reset mechanism is activated. This change was made to accommodate the modifications made in the coupling lever. Also, the tip section of the lever was modified slightly because of the changes in the reset lever.

J) Coupling Lever—The coupling lever was also modified to avoid losing the bite condition that it creates with the override link lever when the auto reset mechanism is not activated or when the handle is pulled a second time (in the case of power loss). The surface area increased in that section to mitigate the risk of bypassing the coupling lever whenever the inside release handle reaches full travel position; this is where the override link lever re-engages with the coupling lever.

K) Manual Release Lever—The manual release lever was modified in the section where the pivot of the coupling lever is located. This was changed to improve the force distribution and ensure that the manual release lever is the one receiving the highest loads, instead of the pivot, as this lever is stronger than the pivot.

L) Switch Link Lever—The switch link lever was extended by a couple of millimeters to accommodate the new position of the switch in the new electrical circuit carrier (ECC). Also, the cam profile that press the switch was slightly reduced to avoid any over compression.

M) Reset Lever—For the reset lever, the mechanical spring was removed. Also, the cam surface for the lever was slightly reduced, to avoid damaging the switch by over compression. Along with these changes, a retention tab was introduced to accommodate a new spring; this spring will help to dictate the position of activation and no activation of the auto reset mechanism, helping the lever to hold its position until the motor is activated. The profile surface where the override link lever first contacts the reset lever when the inside handle is moving was also modified to allow a smoother transition and allow a possible "back out torque" condition whenever the auto reset mechanism is reset.

N) Gear Bumper—In order to accommodate changes in the actuator housing, the power release bumper is modified. This change applies to both bumpers located behind the reset lever and the power release gear (where it is installed).

The term "about" is intended to include the degree of error associated with measurement of the particular quantity based upon the equipment available at the time of filing the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A two-pull, automatic reset, latch system comprising:

an inside release lever adapted to move about a first axis and in a first rotational direction upon actuation, the inside release lever including a stop face facing circumferentially in the first rotational direction;

a coupling lever adapted to move about a second axis and between a coupled condition and a decoupled condition, wherein the coupling lever is in contact with the stop face when in the coupled condition and circumferentially spaced from the stop face when in the decoupled condition, and the first axis is offset from the second axis;

a reset lever adapted to rotate about a third axis, the reset lever including a first block-out surface facing in a second rotational direction opposite to the first rotational direction and with respect to the third axis; and an override link movably engaged to the coupling lever and adapted to move about a fourth axis, the override link including a second block-out surface facing radially outward with respect to the fourth axis;

a biasing member adapted to exert a biasing force upon the coupling lever in the first rotational direction with respect to the second axis;

wherein upon an initial actuation of the inside release lever the override link is adapted to make circumferential contact with a reinforced profile surface of the reset lever with respect to the third axis for back-drive of the reset lever in the first rotational direction and the coupling lever, the coupling lever is in the decoupled condition, and the coupling lever is in contact with the first block-out surface;

wherein upon continued actuation of the inside release lever, the coupling lever is spaced from the first block-out surface and is in contact with the second block-out surface, and the coupling lever is in the decoupled condition; and a spring configured to bias the reset lever into a decoupled position, the spring having a portion contacting a retention feature of the reset lever, the retention feature extending from a tab of the reset lever, the tab forming the first block-out surface and the portion of the spring being located between the retention feature and a portion of the coupling lever.

2. The two-pull, automatic reset, latch system set forth in claim 1, wherein a portion of the coupling lever that contacts the first block-out surface of the reset lever moves circumferentially and parallel to a rotating axis of the inside release lever of the latch system.

3. The two-pull, automatic reset, latch system set forth in claim 2, wherein a tab of the coupling lever is configured to apply loads to an opening in the inside release lever of the latch system as opposed to a pivot of the coupling lever.

4. The two-pull, automatic reset, latch system set forth in claim 3, further comprising:

an auto reset switch configured to be actuated following disengagement of the first block-out surface from the coupling lever and with the second block-out surface in contact with the coupling lever.

5. The two-pull, automatic reset, latch system set forth in claim 1, wherein a tab of the coupling lever is configured to apply loads to an opening in the inside release lever of the latch system as opposed to a pivot of the coupling lever.

6. The two-pull, automatic reset, latch system set forth in claim 1, further comprising:

an auto reset switch configured to be actuated following disengagement of the first block-out surface from the coupling lever and with the second block-out surface in contact with the coupling lever.

7. A two-pull, automatic reset, latch system comprising:

a release system adapted to effectuate unlatching during a power scenario;

a inside release lever moveably engaged to a stationary structure and about a first axis, wherein actuation of the inside release lever during the power scenario does not couple the inside release lever to the release system, and a second, successive, actuation of the inside release lever during a no-power scenario causes coupling of the inside release lever to the release system to effectuate unlatching;

a coupling lever moveably engaged to the inside release lever and about a second axis, wherein the coupling lever is in contact with the release system when coupled;

an override link moveably engaged to the inside release lever about a third axis;

a reset lever rotationally engaged to the stationary structure about a fourth axis and adapted to reset the latch system to a home position after actuation of the inside release lever and during the power scenario while the inside release lever remains decoupled from the release system; and a spring configured to bias the reset lever into a decoupled position, the spring having a portion contacting a retention feature of the reset lever, the retention feature extending from a tab of the reset lever, the tab forming a first block-out surface of the reset lever and the portion of the spring being located between the retention feature and a portion of the coupling lever.

8. The two-pull, automatic reset, latch system set forth in claim 7, wherein a portion of the coupling lever that contacts the first block-out surface of the reset lever extends circumferentially and parallel to a rotating axis of the inside release lever of the latch system.

9. The two-pull, automatic reset, latch system set forth in claim 8, wherein a tab of the coupling lever is configured to apply loads to an opening in the inside release lever of the latch system as opposed to a pivot of the coupling lever.

10. The two-pull, automatic reset, latch system set forth in claim 7, wherein a tab of the coupling lever is configured to apply loads to an opening in the inside release lever of the latch system as opposed to a pivot of the coupling lever.

11. The two-pull, automatic reset, latch system set forth in claim 7, wherein the coupling lever is in contact with the reset lever during an initial first actuation of the inside release lever thereby blocking the coupling lever from coupling the inside release lever with the release system.

12. The two-pull, automatic reset, latch system set forth in claim 11, wherein continued actuation of the inside release lever effectuates a blocking transition wherein the contact of the coupling lever with the reset lever is released and the coupling lever transitions to a sliding contact with the override link.

13. The two-pull, automatic reset, latch system set forth in claim 7, wherein the override link is in contact with the reset lever thereby driving the reset lever during the actuation of the inside release lever.

14. A method of operating a two-pull, automatic reset, latch system comprising:

first moving an inside release lever from a home position, about a first axis, and during a no-power scenario, wherein the inside release lever is moveably engaged to a stationary structure at the first axis;

blocking a coupling lever from coupling the inside release lever to a release system via contact of the coupling lever with a reset lever adapted to engage the release system, wherein the coupling lever is moveably engaged to the stationary structure about a second axis, and the reset lever is moveably engaged to the stationary structure about a third axis;

contacting an override link to the reset lever during the first moving, wherein the override link is moveably engaged to the inside release lever about a fourth axis;

back-driving the reset lever via contact of the override link to the reset lever, and with continued first moving;

transitioning the blocking of the coupling lever by releasing contact of the coupling lever from the reset lever while slideably contacting the coupling lever to the override link with continued first moving;

releasing the reset lever from the override link with continued first moving;

unblocking the coupling lever;

fixing the override link to the coupling lever with continued first moving;

engaging the inside release lever to the release system via the coupling of the coupling lever between the inside release lever and the release system;

performing a second moving of the inside release lever to actuate the release system during the no-power scenario; and biasing the reset lever into a decoupled position with a spring, the spring having a portion contacting a retention feature of the reset lever, the retention feature extending from a tab of the reset lever, the tab forming a first block-out surface of the reset lever and the portion of the spring being located between the retention feature and a portion of the coupling lever.

15. The method set forth in claim 14, wherein the first, second, third, and fourth axes are spaced from and parallel to one-another.

16. The method set forth in claim 14, wherein the second moving of the inside release lever will not actuate the release system during a power scenario.

17. The method set forth in claim 14, wherein a portion of the coupling lever that contacts the first block-out surface of the reset lever extends circumferentially and parallel to a rotating axis of the inside release lever of the latch system.

18. The method set forth in claim 17, wherein a tab of the coupling lever is configured to apply loads to an opening in the inside release lever of the latch system as opposed to a pivot of the coupling lever.

19. The method set forth in claim 14, wherein a tab of the coupling lever is configured to apply loads to an opening in the inside release lever of the latch system as opposed to a pivot of the coupling lever.

* * * * *